(12) United States Patent
Kumahashi

(10) Patent No.: US 12,058,291 B2
(45) Date of Patent: Aug. 6, 2024

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Shu Kumahashi, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/685,191

(22) Filed: Mar. 2, 2022

(65) Prior Publication Data

US 2022/0189184 A1 Jun. 16, 2022

Related U.S. Application Data

(63) Continuation of application No. 17/036,795, filed on Sep. 29, 2020, now Pat. No. 11,295,156, which is a
(Continued)

(30) Foreign Application Priority Data

Nov. 26, 2018 (JP) .................... 2018-220735

(51) Int. Cl.
*G06V 30/148* (2022.01)
*G06F 3/041* (2006.01)
(Continued)

(52) U.S. Cl.
CPC ......... *H04N 1/00411* (2013.01); *G06F 3/041* (2013.01); *G06F 18/24* (2023.01);
(Continued)

(58) Field of Classification Search
CPC ................ G06F 3/041; H04N 1/00411; H04N 2201/0094
(Continued)

(56) References Cited

U.S. PATENT DOCUMENTS 8,312,660 B1* 11/2012 Fujisaki .................. F41A 17/08
  455/457
10,740,118 B1* 8/2020 Pottjegort ................. G06T 7/74
(Continued)

FOREIGN PATENT DOCUMENTS

JP  2008293523 A  12/2008
JP  2013042436 A  2/2013
(Continued)

*Primary Examiner* — Akwasi M Sarpong
*Assistant Examiner* — Pawan Dhingra
(74) *Attorney, Agent, or Firm* — Canon U.S.A., Inc. IP Division

(57) ABSTRACT

An image processing apparatus configured to perform character recognition processing to recognize characters included in image data and acquire character information, display characters indicated by the character information acquired, accept a selection of characters displayed by a user, generate a folder path based on the selected characters, and transmit the image data to a folder indicated by the folder path. In a case where the selection of characters is accepted multiple times, generate a folder path based on a combination of selected characters and transmit the image data to a folder indicated by the folder path.

47 Claims, 21 Drawing Sheets

Related U.S. Application Data continuation of application No. 16/684,380, filed on Nov. 14, 2019, now Pat. No. 10,860,880.

(51) Int. Cl.
*G06F 18/24* (2023.01)
*G06V 30/413* (2022.01)
*H04N 1/00* (2006.01)
*G06V 30/10* (2022.01)

(52) U.S. Cl.
CPC .......... *G06V 30/153* (2022.01); *G06V 30/413* (2022.01); *G06V 30/10* (2022.01); *H04N 2201/0094* (2013.01)

(58) Field of Classification Search
USPC .............................. 358/1.15, 1.16, 1.14, 1.13
See application file for complete search history.

(56) References Cited

U.S. PATENT DOCUMENTS

| | | | |
|---|---|---|---|
| 10,949,662 B2 * | 3/2021 | Kanada | G06V 30/1983 |
| 11,128,767 B2 * | 9/2021 | Tsukada | G06V 30/153 |
| 2005/0063009 A1 | 3/2005 | Ehara | |
| 2017/0099403 A1 | 4/2017 | Honda | |
| 2019/0228220 A1 * | 7/2019 | Matsumoto | G06V 30/418 |

FOREIGN PATENT DOCUMENTS

| | | | |
|---|---|---|---|
| JP | 2015164021 A | 9/2015 | |
| JP | 2017219964 A | 12/2017 | |

\* cited by examiner

FIG.7

DEVICE SERIAL No.: abcd0101

APPLICATION MANAGEMENT | ONE-TOUCH TRANSMISSION SCAN > DETAILED INFORMATION > BUTTON EDITING > SELECT FROM ADDRESS BOOK

SELECT FROM ADDRESS BOOK ~800

SELECT ADDRESS FROM ADDRESS BOOK AND CLICK [OK]

| OK ~805 | CANCEL ~806 |

ADDRESS BOOK

TYPE: BEST MEMBER ▼ | DISPLAY SWITCH 801  802

| SELECTION | NUMBER | TYPE | NAME | DESTINATION |
|---|---|---|---|---|
| ☐ | 01 | ✉ | email_a | email_a@sample.co.jp |
| ☐ | 02 | ✉ | email_b | email_b@sample.co.jp |
| ★ | 03 | 📄 | REFERRAL FORM | \\FILE SERVER\REFERRAL FORM |
| ☐ | 04 | 📄 | MEDICAL QUESTIONNAIRE | \\FILE SERVER\MEDICAL QUESTIONNAIRE |

803 — BEST MEMBER
804 — SELECTION

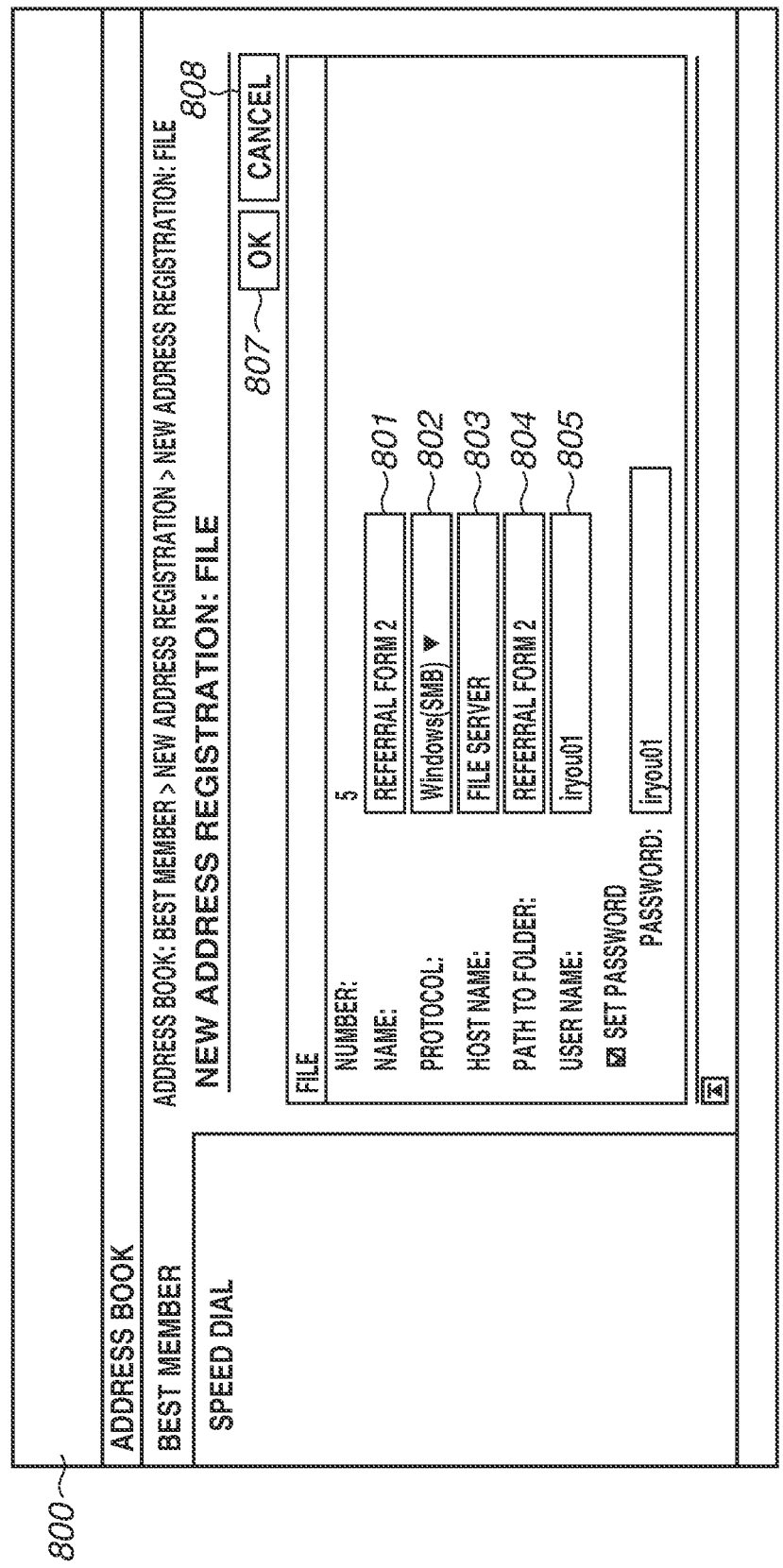

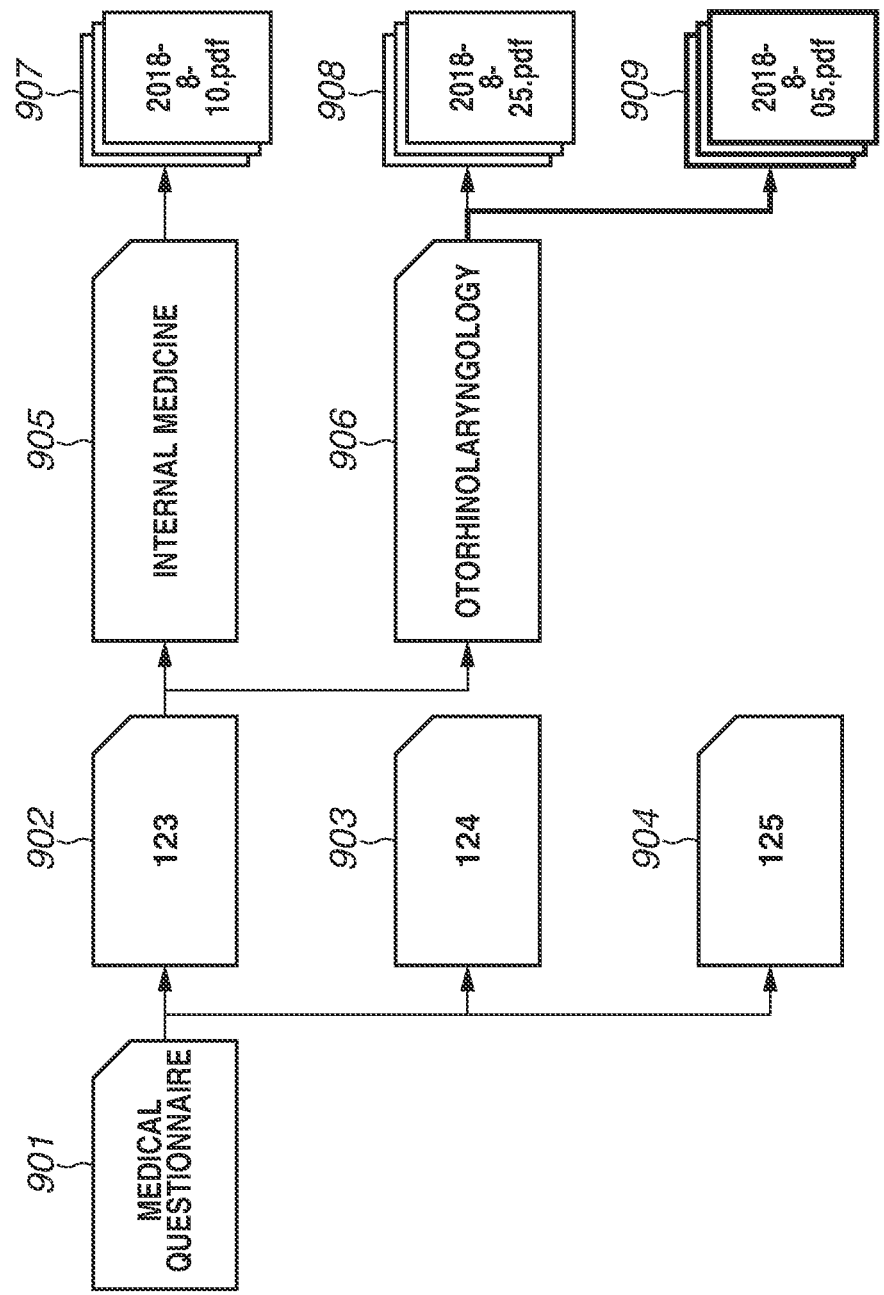

IMAGE PROCESSING APPARATUS, METHOD OF CONTROLLING THE SAME, AND STORAGE MEDIUM

CROSS-REFERENCE TO RELATED APPLICATIONS

This application is a continuation, and claims the benefit, of U.S. patent application Ser. No. 17/036795, filed on Sep. 29, 2020, which is a continuation, and claims the benefit, of U.S. patent application Ser. No. 16/684,380, filed on Nov. 14, 2019, now issued as U.S. Pat. No. 10,860,880, issued on Dec. 8, 2020, and claims the benefit of, and priority to, Japanese Patent Application No. 2018-220735, filed on Nov. 26, 2018. The above cited patent applications are incorporated herein by reference in their entirety.

BACKGROUND OF THE INVENTION

Field of the Invention

The present invention relates to an image processing apparatus, a method of controlling the same, and a storage medium.

Description of the Related Art

Japanese Patent Application Laid-Open No. 2005-234708 discusses an image processing apparatus that generates image data by scanning an image on a document, performs character recognition processing on an area in the image designated by a user in advance, and transmits the image data to a folder with a folder name indicated by a character string obtained by the character recognition processing.

The image processing apparatus discussed in Japanese Patent Application Laid-Open No. 2005-234708 executes the character recognition processing on the designated area, retrieves the folder with the folder name indicated by the character string obtained by the character recognition processing, and transmits the image data to the folder.

SUMMARY OF THE INVENTION

If a folder path for a folder to which image data is transmitted is input character by character through a keyboard, the input of the folder path requires a lot of time and labor. If a folder path composed of a plurality of hierarchies is input, the input of the folder path requires more time and labor.

According to the method discussed in Japanese Patent Application Laid-Open No. 2005-234708, it is possible to set a character string corresponding to one hierarchy by designating an area, but it is not possible to designate a plurality of hierarchies.

The present disclosure has been made in view of the above-described issues, and the present disclosure is directed to reducing the time and labor required for a user to set a folder path composed of a plurality of hierarchies for a folder to which image data is transmitted.

According to an aspect of the present disclosure, an image processing apparatus includes a character recognition unit configured to perform character recognition processing to recognize characters included in image data and acquire character information, a display unit configured to display characters indicated by the character information acquired by the character recognition unit, an acceptance unit configured to accept a selection of characters displayed on the display unit by a user, a generation unit configured to generate a folder path based on the selected characters, and a transmission unit configured to transmit the image data to a folder indicated by the folder path. In a case where the selection of characters is accepted multiple times by the acceptance unit, the generation unit generates a folder path based on a combination of selected characters, and the transmission unit transmits the image data to a folder indicated by the folder path.

Further features of the present invention will become apparent from the following description of exemplary embodiments with reference to the attached drawings.

BRIEF DESCRIPTION OF THE DRAWINGS

FIG. 7 illustrates an example of an address selection screen.

FIG. 8 illustrates an example of an address registration screen.

FIG. 9 illustrates an example of a folder configuration of a file server which is a file transmission destination.

DESCRIPTION OF THE EMBODIMENTS

Figure 1:
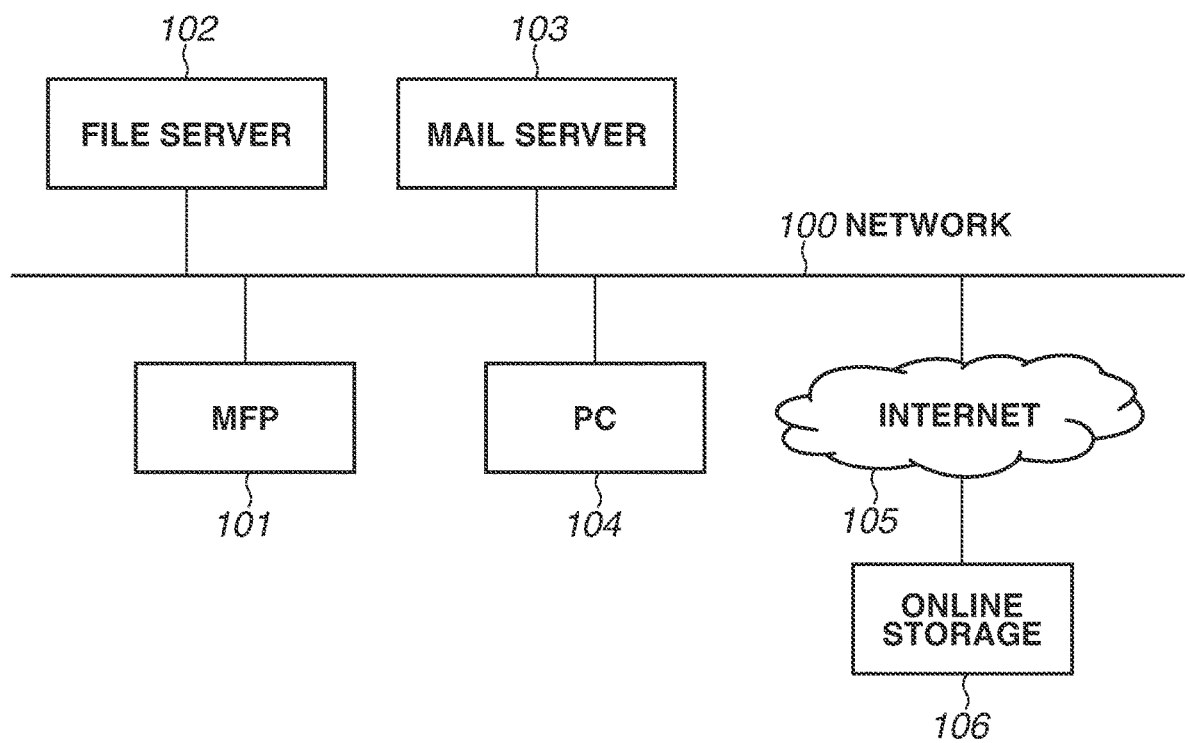
FIG. 1 illustrates a configuration example of a scanning system.

Modes for carrying out the present invention will be described below with reference to the accompanying drawings. Configurations described in the following exemplary embodiments are merely examples, and the present invention is not limited to the configurations illustrated in the drawings.

A first exemplary embodiment will be described. FIG. 1 illustrates a configuration example of a scanning system according to an exemplary embodiment of the present disclosure. The scanning system according to the present exemplary embodiment includes a multi-function peripheral (MFP) 101, which is an example of an image processing apparatus, a file server 102, which is an example of an information processing apparatus, a mail server 103, and an online storage 106. The MFP 101, the file server 102, the mail server 103, and the online storage 106 are each connected to a local area network (LAN) 100. On the LAN 100, the MFP 101, the file server 102, the mail server 103, and a personal computer (PC) 104 are communicably connected via a network. The MFP 101 and the online storage 106 communicate with each other via the LAN 100 and the Internet 105.

The MFP 101 transmits image data generated by scanning an image on a document to each of the file server 102, the mail server 103, and the online storage 106. The image data used in the present exemplary embodiment is not limited to electronic data obtained by converting an image into raw data, but instead may be electronic data based on an image format, such as Tagged Image File Format (TIFF) or Joint Photographic Experts Group (JPEG), or electronic data based on Portable Document Format (PDF). The file server 102 is a file server that is compatible with File Transfer Protocol (FTP) and Server Message Block (SMB) protocol. The mail server 103 is a mail server that is compatible with Simple Mail Transfer Protocol (SMTP). The online storage 106 is an online storage that is compatible with Web-Based Distributed Authoring and Versioning (WebDAV) (which is a file-sharing protocol using Hypertext Transfer Protocol (HTTP)). The PC 104 can refer to and update setting values by accessing a web server included in the MFP 101 by HTTP communication. The LAN 100 may be a wired LAN using Ethernet®, or may be a wireless LAN.

Figure 2:
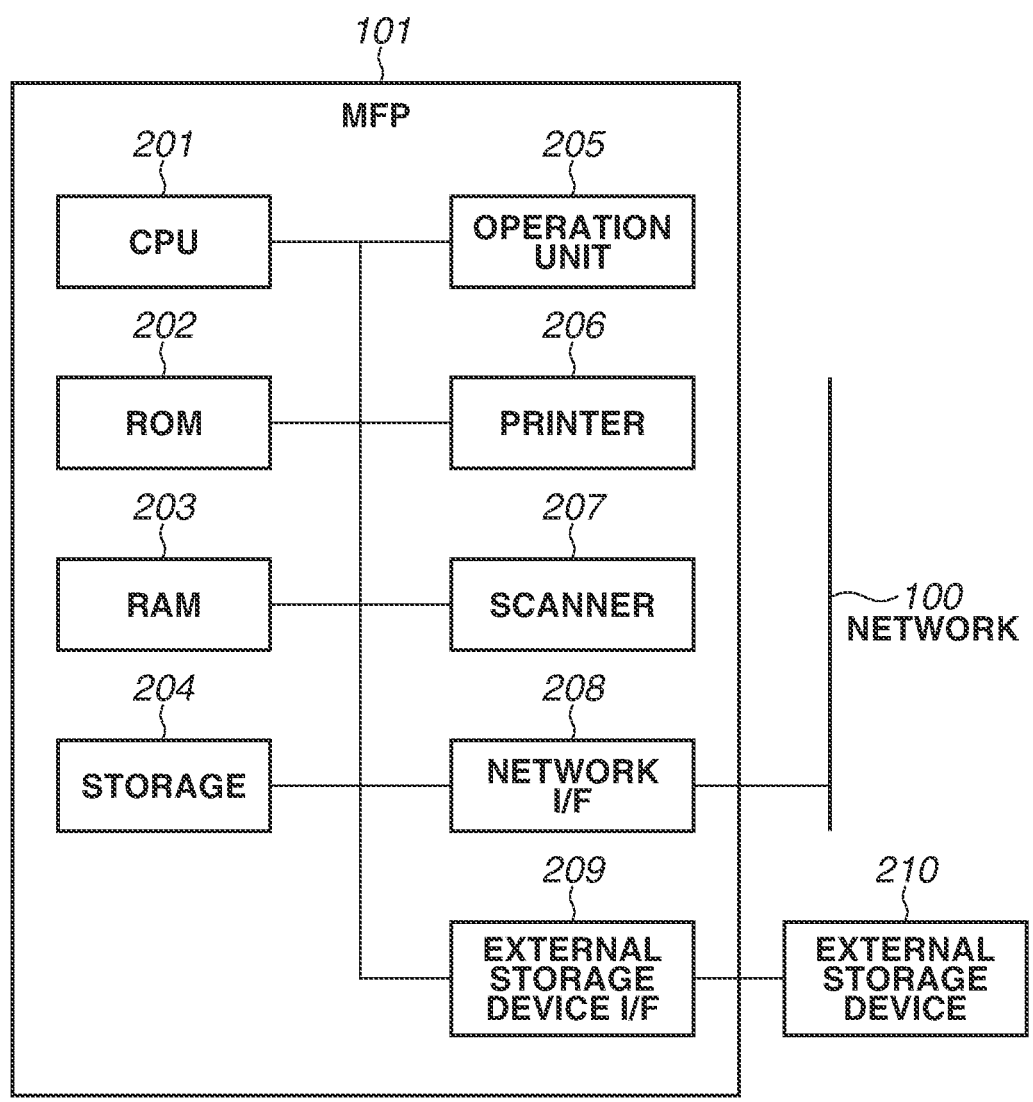
FIG. 2 illustrates a hardware configuration example of a multi-function peripheral (MFP).

FIG. 2 illustrates a hardware configuration example of the MFP 101. The MFP 101 includes a central processing unit (CPU) 201, a read-only memory (ROM) 202, a random access memory (RAM) 203, a storage 204, an operation unit 205, a printer 206, a scanner 207, a network interface (I/F) 208, and an external storage device I/F 209.

The CPU 201 controls the various pieces of hardware 202 to 208, which constitute the MFP 101, to thereby implement functions of the MFP 101. The CPU 201 sends signals to the various pieces of hardware via a bus line, to thereby implement data communication with other pieces of hardware.

Further, the CPU 201 of the MFP 101 controls the operation of the MFP 101 based on control programs stored in the ROM 202. Specifically, the CPU 201 executes an operating system (OS) for controlling the MFP 101, and driver programs for controlling hardware. Application programs arranged on the OS operate mutually, so that operation and control of a function desired by a user are performed. The OS and various programs are stored in the ROM 202. The OS and various programs are executed by being read out from the RAM 203.

The ROM 202 is a memory for storing programs and various data to be used by the CPU 201. The RAM 203 is a work memory for temporarily storing programs and data to be used by the CPU 201 to perform calculations. The storage 204 is a storage device that stores various data, various programs, and the like.

While a flash memory is used as the storage 204 in the present exemplary embodiment, auxiliary storage devices such as a solid state drive (SSD), a hard disk drive (HDD), and an embedded Multi Media Card (eMMC) may also be used. The MFP 101 has a configuration in which a single CPU 201 executes each process illustrated in flowcharts to be described below using a single memory (RAM 203), but instead may have another configuration. For example, each process illustrated in the flowcharts to be described below can also be executed by causing a plurality of CPUs, a plurality of RAMs, a plurality of ROMs, and a plurality of storages to cooperate with each other. Some of the processes may be executed using hardware circuits such as an application specific integrated circuit (ASIC) and a field-programmable gate array (FPGA).

The operation unit 205 is a user interface, such as a touch panel, which is used by the user to operate the MFP 101. The operation unit 205 is used as an acceptance unit that accepts an operation or input by the user. The operation unit 205 can also be used as a display unit that displays a screen or the like for operating the MFP 101.

The printer 206 is a unit that implements a print function. The CPU 201 controls the printer 206 to execute a print job received from the PC 104 and print an image on a sheet. The print job described herein refers to data including an instruction for causing the MFP 101 to execute print processing, image data, and print setting information.

The scanner 207 is a unit that implements a scan function. The CPU 201 controls the scanner 207 to perform processing of generating image data by optically scanning an image on a document.

The network I/F 208 is a network I/F for establishing a wired LAN communication such as Ethernet®. The network I/F 208 may be a network I/F for establishing a wireless LAN communication, or may be a universal serial bus (USB)-LAN I/F or the like.

The external storage device I/F 209 is an I/F used for the MFP 101 to communicate with an external storage device 210. The CPU 201 controls the external storage device I/F 209 to cause the external storage device 210 to store image data. In the present exemplary embodiment, a USB interface is used as the external storage device I/F 209 and a USB memory is used as the external storage device 210. Alternatively, a secure digital (SD) card slot for communicating with an external storage device, such as an SD card, may be used as the external storage device I/F 209.

Figure 3:
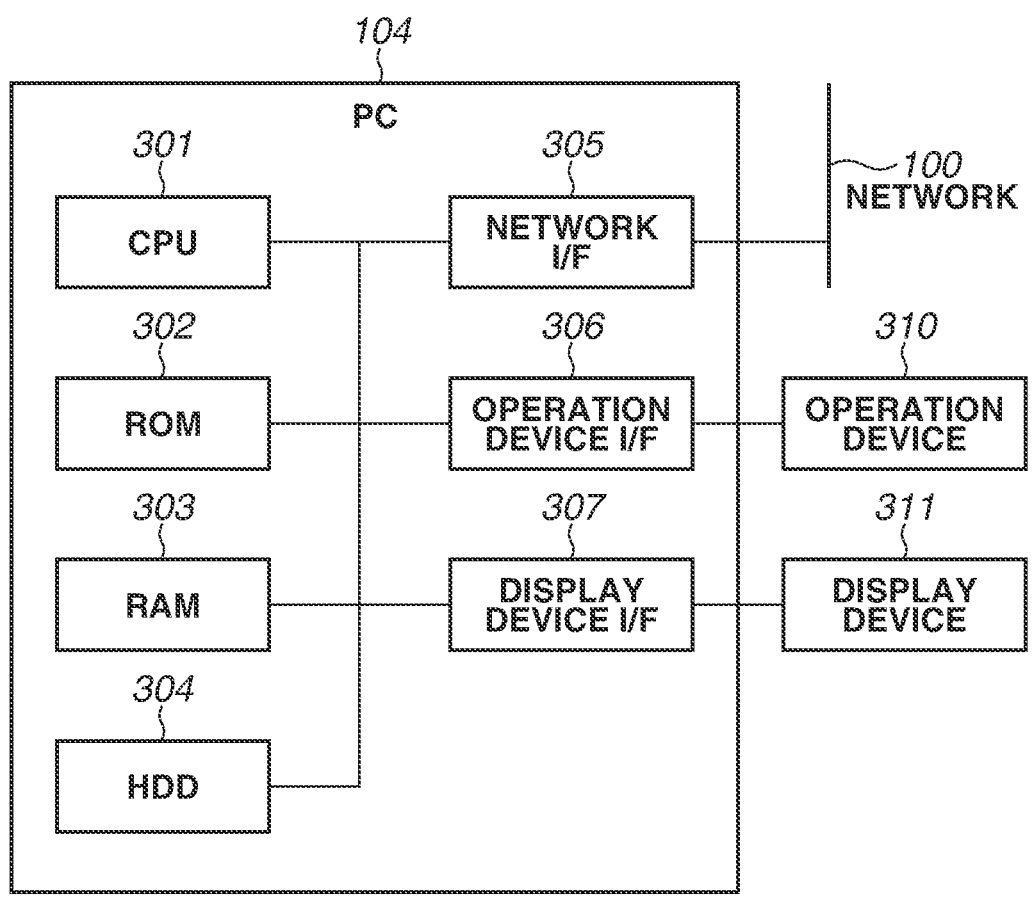
FIG. 3 illustrates a hardware configuration example of a personal computer (PC).

FIG. 3 illustrates a hardware configuration example of the PC 104. The PC 104 includes a CPU 301, a ROM 302, a RAM 303, an HDD 304, a network I/F 305, an operation device I/F 306, and a display device I/F 307.

The CPU 301 controls the various pieces of hardware 302 to 307, which constitute the PC 104, to thereby implement functions of the PC 104. The CPU 301 sends signals to the various pieces of hardware via a bus line, to thereby implement data communication with other pieces of hardware.

The CPU 301 of the PC 104 controls the operation of the PC 104 based on control programs stored in the ROM 302. Specifically, the CPU 301 executes an OS and the like for controlling the PC 104. Application programs arranged on the OS operate mutually, so that operation and control of a function desired by the user are performed. The OS and various programs are stored in the ROM 302. The OS and various programs are executed by being read out from the RAM 303.

The ROM 302 is a memory for storing programs and various data to be used by the CPU 201. The RAM 303 is a work memory for temporarily storing programs and data to be used by the CPU 201 to perform calculations. The HDD 304 is a storage device that stores various data, various programs, and the like.

The network I/F 305 is a network I/F for establishing a wired LAN communication such as Ethernet®. The network I/F 305 may be a network I/F for establishing a wireless LAN communication, or may be a USB-LAN I/F or the like.

The operation device I/F 306 is an I/F for connecting the PC 104 with an operation device 310 such as a keyboard and a mouse.

The display device I/F 307 is an I/F for connecting the PC 104 with a display device 311 such as a liquid crystal monitor.

In the present exemplary embodiment, the PC 104 is connected to an external operation device and an external display device. However, for example, an operation unit and a display unit may be incorporated in the PC 104.

Figure 4:
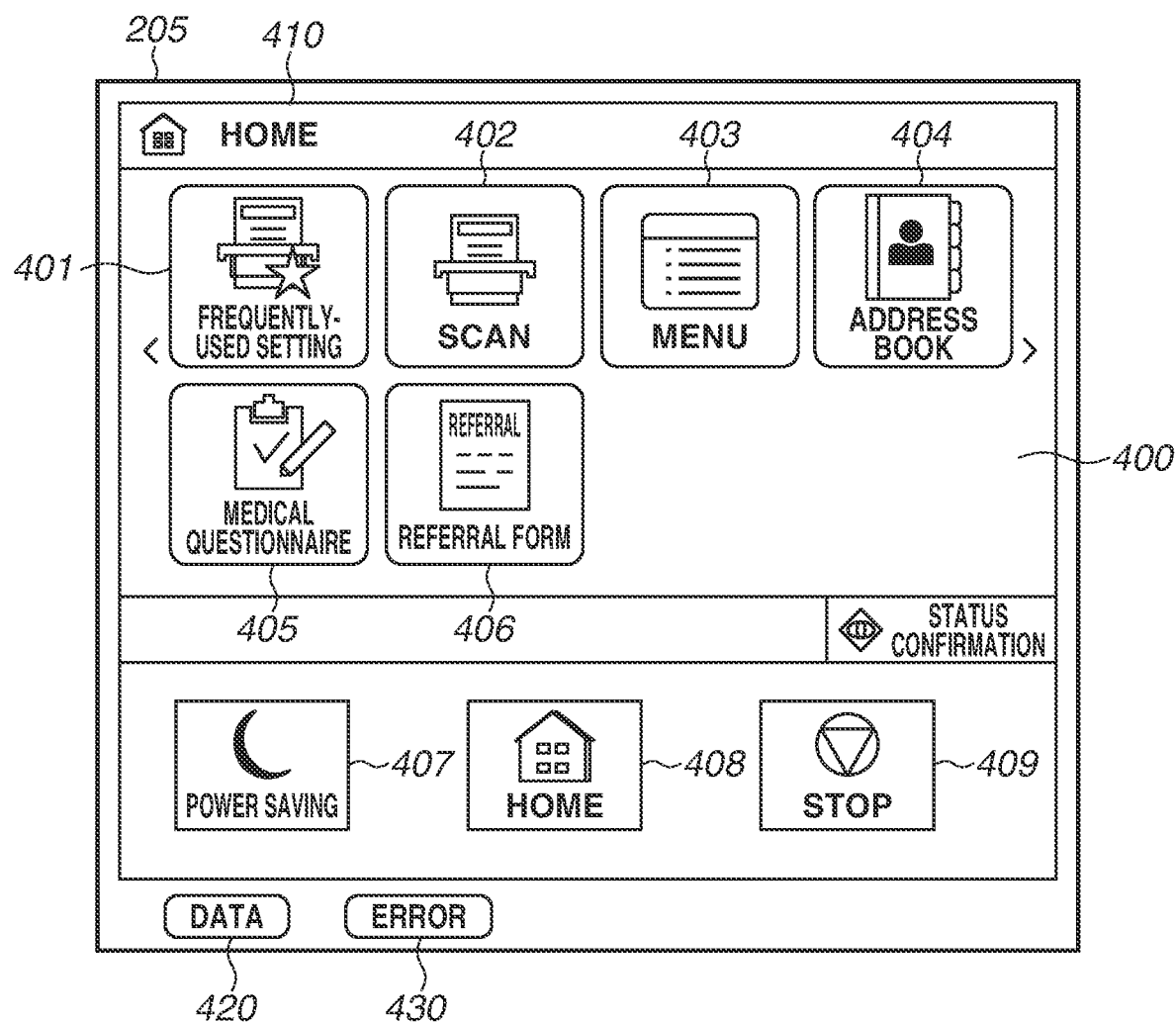
FIG. 4 illustrates an example of a screen to be displayed on an operation unit.

FIG. 4 illustrates an example of a screen to be displayed on the operation unit 205. The operation unit 205 includes a touch panel 410, a data light-emitting diode (LED) 420, and an error LED 430. A home screen 400 which is displayed immediately after the MFP 101 is started is displayed on the touch panel 410. The home screen 400 is a screen for making an instruction to execute each function of the MFP 101. A frequently-used setting button 401, a scan button 402, a menu button 403, an address book button 404, a medical questionnaire button 405, a referral form button 406, and the like are displayed on the home screen 400. A power saving button 407, a home button 408, and a stop button 409 are constantly displayed on the home screen 400. The operation unit 205 may be provided with the power saving button 407, the home button 408, and the stop button 409 as hardware keys.

The frequently-used setting button 401 is a button for displaying a screen for executing a specific function in a state where a setting made by the user is input when frequently-used setting button 401 is selected by the user.

The scan button 402 is a button for displaying a screen when the scan button 402 is selected to execute scan processing to generate image data, perform mail transmission or file transmission of the generated image data, and store the generated image data in the external storage device 210. Mail transmission refers to transmitting image data generated by scanning a document by attaching the generated image data to an electronic mail File transmission refers to transmitting the image data to the file server 102, the PC 104, or the like using a communication protocol such as SMB or FTP.

The menu button 403 is a button for displaying a menu screen when the menu button 403 is selected by the user.

The address book button 404 is a button for displaying a screen to display a registered address (destination information) when the address book button 404 is selected by the user. The screen for displaying the address displays a transmission type, such as electronic mail transmission, SMB transmission, FTP transmission, or WebDAV transmission as well as destination information, including a mail address, a host name, and server information.

The medical questionnaire button 405 and the referral form button 406 are one-touch transmission buttons. Each one-touch transmission button is a button for displaying a screen when the one-touch transmission button is selected by the user to scan an image on a document according to a scan setting preliminarily made by the user, generate image data, and transmit the generated image data based on the transmission type preliminarily set by the user.

The power saving button 407 is a button for causing the MFP 101 to transition to a power saving state when the power saving button 407 is selected by the user.

The home button 408 is a button for displaying the home screen 400 on the operation 205 when the home button 408 is selected by the user.

The stop button 409 is a button for stopping the execution of a job, such as the print job being executed by the MFP 101, when the stop button 409 is selected by the user. The execution of a copy job or a transmission job may be stopped when the stop button 409 is selected by the user.

The data LED 420 and the error LED 430 notify the user of the state of the MFP 101. The data LED 420 is turned on when electronic mail transmission or file transmission is executed, and the error LED 430 is turned on when an error occurs in the MFP 101.

The home screen 400 is a function selection screen for selecting a function to be used by the user from among a plurality of functions including a copy function for performing printing, for example, based on image data, and a transmission function for scanning a document to generate image data and transmitting the generated image data to an external device.

In this case, there are such issues that if a folder path for a folder to which image data is transmitted is input character by character through a keyboard, the input of the folder path requires a lot of time and labor, and if a folder path composed of a plurality of hierarchies is input, the input of the folder path requires more time and labor.

According to the method discussed in Japanese Patent Application Laid-Open No. 2005-234708, it is possible to set a character string corresponding to one hierarchy by designating an area, but it is not possible to designate a plurality of hierarchies. To deal with this issue, the time and labor required for the user to set a folder path composed of a plurality of hierarchies for a folder to which image data is transmitted can be reduced by executing the following processing.

Figure 5:
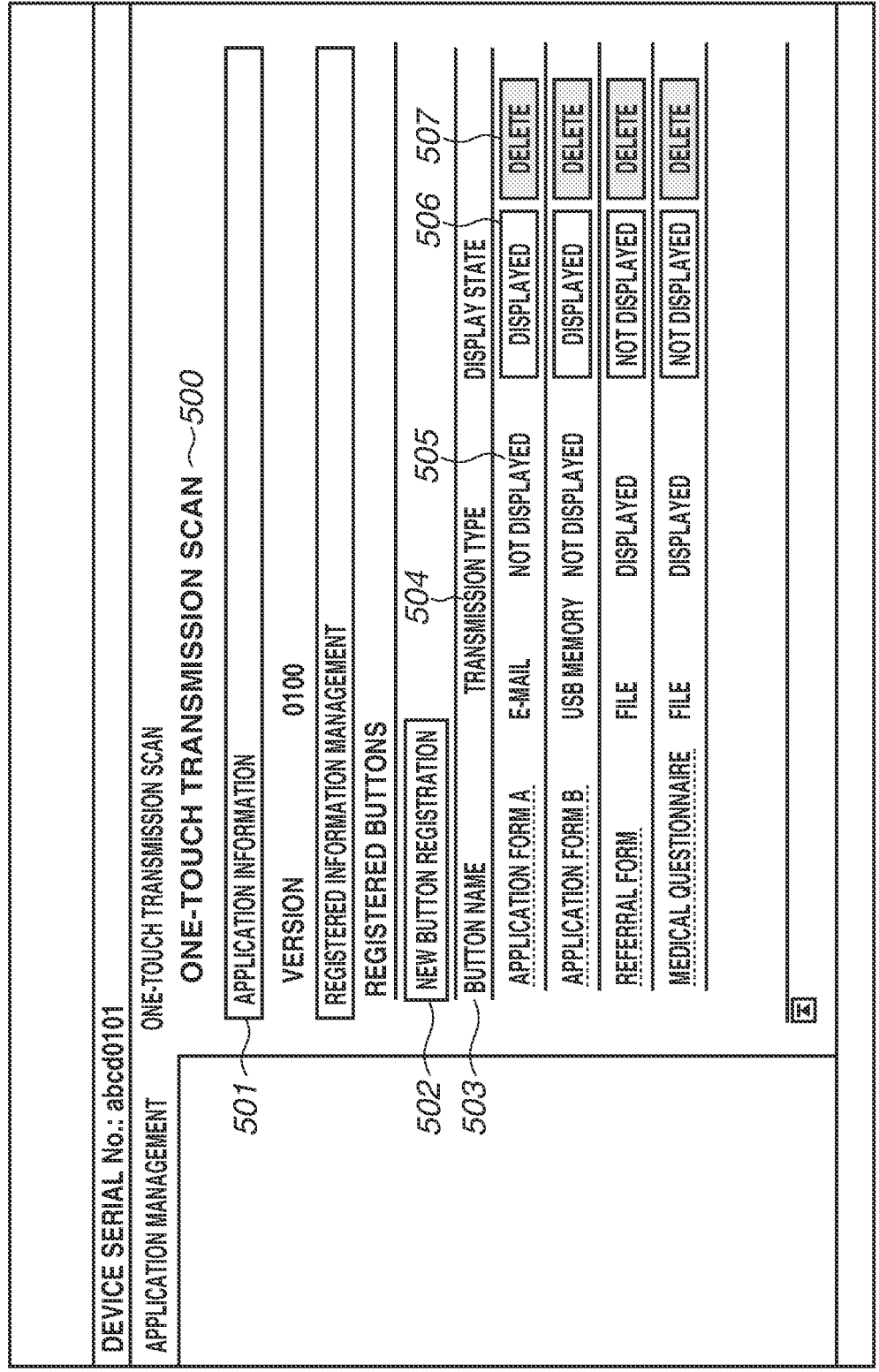
FIG. 5 illustrates an example of a one-touch transmission scan setting screen to be displayed on a display device.

FIG. 5 illustrates an example of a one-touch transmission scan setting screen to be displayed on the display device 311.

A one-touch transmission scan setting screen 500 illustrated in FIG. 5 is displayed on, for example, the display device 311 connected to the PC 104 that is accessing the web server of the MFP 101 by HTTP communication.

Application information 501, a new button registration button 502, items 503 to 505, a displayed/not displayed switch button 506, and a delete button 507 are displayed on the one-touch transmission scan setting screen 500.

The application information 501 is an area for displaying an application version. In FIG. 5, the version number 0100 is displayed.

Figure 6:
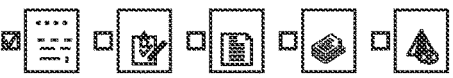
FIG. 6 illustrates an example of a button setting edit screen for executing one-touch transmission scan.

The new button registration button 502 is a button that is displayed on a screen to be displayed on the operation unit 205 when the new button registration button 502 is selected by the user to newly register a button for executing one-touch transmission scan. When the new button registration button 502 is selected, a button setting edit screen 600 illustrated in FIG. 6 is displayed on the display device 311. The button setting edit screen 600 illustrated in FIG. 6 will be described in detail below.

The item 503 indicates the name of a button for executing one-touch transmission scan registered in the MFP 101.

The item 504 indicates a transmission type set on the button for executing one-touch transmission scan registered in the MFP 101.

The item 505 indicates a display state of the button for executing one-touch transmission scan registered in the MFP 101. The displayed/not displayed switch button 506 for changing the display state and the delete button 507 are also displayed. For example, when the display state of a "referral form" button is "displayed", a button such as the referral form button 406 illustrated in FIG. 4 is displayed on the home screen 400 on the touch panel 410. The displayed/not displayed switch button 506 is a button for selecting "displayed" or "not displayed" of the button by toggling.

When the delete button 507 is selected by the user, information on the button registered in the MFP 101 is deleted.

The button for executing one-touch transmission scan registered in the MFP 101 indicates that, for example, the transmission type of the button with a name "application form A" is "e-mail" and the display state is "not displayed". Not only when the new button registration button 502 is selected, but also when the name "application form A" of the button is selected, the button setting edit screen 600 illustrated in FIG. 6 is displayed on the display device 311.

FIG. 5 illustrates an example where four buttons, i.e., "application form A", "application form B", "referral form", and "medical questionnaire", are registered. The display state of each of the buttons "referral form" and "medical questionnaire" is "displayed", so that these buttons are displayed on the home screen 400. However, since the display state of each of the buttons "application form A" and "application form B" is "not displayed", these buttons are not displayed on the home screen 400.

FIG. 6 illustrates an example of a button setting edit screen for executing one-touch transmission scan. The button setting edit screen 600 illustrated in FIG. 6 is displayed on, for example, the display device 311 connected to the PC 104 that is accessing the web server of the MFP 101 by HTTP communication.

The button setting edit screen 600 is displayed when the new button registration button 502 illustrated in FIG. 5, or the name of the button is selected by the user. In a case where the button setting edit screen 600 is displayed when the name of the button is selected by the user, the button setting edit screen 600 is displayed in a state where a previously-set value is input in each item of the button setting edit screen 600. In a case where the button setting edit screen 600 is displayed when the new button registration button 502 is selected by the user, the button setting edit screen 600 is displayed in a state where no value is input in each item of the button setting edit screen 600. A default value may be preliminarily input in each item of the button setting edit screen 600.

An entry field 601 is an entry field for setting the name of the one-touch transmission button. A character string "referral form" is input in the entry field 601. The one-touch transmission button used herein refers to a button for executing one-touch transmission scan when the one-touch transmission button is selected by the user.

A pull-down 602 is an object for setting a file name. The pull-down 602 enables selection of "button name" and "automatic". When "button name" is selected, the button name input in the entry field 601 indicates the name of a file to be transmitted. When "automatic" is selected, an automatically-determined character string is used as the name of the file. For example, a date and time when scan was performed is used as the name of the file by selecting the one-touch transmission button registered on the screen illustrated in FIG. 6. When an extension button 1501 of a medical questionnaire screen 1500 to be described below is selected and a character string indicating an extension is added, the name of the file is assigned by prioritizing the setting to be made when the extension button 1501 is selected.

In a case where a checkbox 603 is checked, a keyword set during file output is enabled. The keyword will be described below with reference to FIG. 7.

A keyword character string setting button 604 is a button for displaying a keyword character string setting screen when the keyword character string setting button 604 is selected by the user.

A pull-down 605 is an object for making a setting as to how to sort the file to be transmitted, or whether to sort the file. The pull-down 605 enables selection of one of "not sorted", "sorted (file)", "sorted (folder)", and "sorted (file and folder)". When "not sorted" is set, the keyword is not used. When "sorted (file)" is set, the keyword is included in an output file name. When "sorted (folder)" is set, the keyword is included in the name of a folder in which the file is stored. When "sorted (file and folder)" is set, the keyword is included in the file name and the name of a folder to which the file is output. Detailed processing to be performed when each setting is made in the pull-down 605 will be described with reference to FIGS. 16 and 17.

A pull-down 606 is an object for selecting a transmission type to be used when image data generated by scanning a document is transmitted. The pull-down 606 enables selection of "file", "e-mail", or "USB memory". When "file" is selected and a switch button 607 is selected, image data is transmitted to a folder in the PC 104 or to the file server 102 by using a protocol such as SMB, FTP, WebDAV, or Secure File Transfer Protocol (SFTP). When "e-mail" is selected, image data is transmitted to a destination by SMTP. When "USB memory" is selected, image data is stored in the USB memory as the external storage device 210 connected to the MFP 101.

The switch button 607 is a button for switching the setting for the transmission type to the transmission type displayed in the pull-down 606. When the switch button 607 is selected in a state where the transmission type is selected in the pull-down 606, information corresponding to the selected transmission type is displayed in an item 608, an area 609, and the like.

The item 608 is an item in which various settings, such as a scan setting to be made when scanning is performed by one-touch transmission scan, and a transmission setting to be made during transmission, can be input. For example, a transmission destination, a scan size, a file format, an orientation of a document, and the like are set in the item 608.

The area 609 is an area for displaying the transmission destination to which image data generated by scanning a document is transmitted. The destination set in this case is a folder path to be combined with a character string of a text object to be described below. The area 609 is a text area in which information cannot be input and edited. An address selected on an address selection screen is displayed in the area 609. The selected address will be described below.

When a selection button 610 is selected from an address book by the user, an address selection screen 700 on which addresses in the address book stored in the MFP 101 can be selected is displayed.

A pull-down 611 is a pull-down for setting a file format to be used when image data generated by scanning an image on a document is converted into a file. The file is generated based on the file format selected here.

An OK button 612 is a button for storing the setting for the one-touch transmission button in the storage 204 with the content set on the button setting edit screen 600. When the OK button 612 is selected, the setting is stored in the storage 204. A cancel button 613 is a button for discarding the setting. When the OK button 612 or the cancel button 613 is pressed, the one-touch transmission scan setting screen 500 illustrated in FIG. 5 is displayed.

FIG. 7 illustrates an example of the address selection screen. The address selection screen 700 is displayed when the selection button 610 is selected from the address book on the button setting edit screen 600 illustrated in FIG. 6. The address selection screen 700 illustrated in FIG. 7 is displayed on, for example, the display device 311 connected to the PC 104 that is accessing the web server of the MFP 101 by HTTP communication.

A pull-down 701 is a list for switching the type of the address book to be displayed on the address selection screen 700. The pull-down 701 enables selection of one of "best member" and "speed dial" (not illustrated).

A display switch button 702 is a button for changing the type of the address book to be displayed on the address selection screen 700 to the type displayed in the pull-down 701 when the display switch button 702 is selected by the user.

An area 703 is a display area on which the name of the address book is displayed. A list 704 is an area on which a list of addresses is displayed, and includes items such as selectable checkbox, number, type, name, and destination. As the checkbox, one of two types of checkboxes, i.e., a checkable checkbox and an uncheckable checkbox, is displayed. An address management number is displayed as the number. The type is an area on which an icon is displayed, and the icon varies depending on the type of an address. A name given to the address is displayed as the name.

When an OK button 705 is selected in a state where the checkbox is checked, the address is displayed on the area 609. Further, the MFP 101 stores the transmission destination of image data as an address in the storage 204.

Supplementary description of the display of the checkable checkbox and the uncheckable checkbox will be given below. FIG. 7 illustrates a display in a case where an address is selected from an address book of "best member" in which two addresses for the transmission type "e-mail" and two addresses for the transmission file "file" are registered in a state where "file" is selected in the pull-down 606 illustrated in FIG. 6. The checkable checkbox is displayed for the address that matches the type in the pull-down 606. Specifically, the uncheckable checkbox is displayed for addresses at a number 01 and a number 02, and the checkable checkbox is displayed for addresses at a number 03 and a number 04.

The OK button 705 is a button for establishing the address setting with the content set on the address selection screen 700. A cancel button 706 is a button for discarding the setting content. When the OK button 705 or the cancel button 706 is selected, the button setting edit screen 600 illustrated in FIG. 6 is displayed.

The setting for the medical questionnaire button 405 according to the present exemplary embodiment will now be described. The medical questionnaire button 405 is created when "medical questionnaire" is input in the entry field 601 and "button name" is selected in the pull-down 602 on the button setting edit screen 600 illustrated in FIG. 6 and the checkbox 603 is checked. The medical questionnaire button 405 is also created when "sorted (folder)" is selected in the pull-down 605 and "file" is selected in the pull-down 606 on the button setting edit screen 600 illustrated in FIG. 6. In the "medical questionnaire" button, an address "\\file server\medical questionnaire" at the number 04 illustrated in FIG. 7 is selected.

FIG. 8 illustrates an example of an address registration screen. An entry field 801, a pull-down 802, an entry field 803, an entry field 804, an entry field 805, an entry field 806, an OK button 807, and a cancel button 808 are displayed on an address registration screen 800. The address registration screen 800 is a screen for registering a destination when file transmission is set as the transmission type.

The entry field 801 is an entry field for inputting the name of a destination. The pull-down 802 is an object for selecting a protocol to be used when image data is transmitted to a transmission destination. The pull-down 802 enables selection of one of three types of protocols, i.e., SMB, FTP, and WebDAV.

The entry field 803 is an entry field for inputting a host name of a transmission destination. A resolvable server name or an IP address is input. The entry field 804 is an entry field for inputting a folder path to a transmission destination.

The entry fields 805 and 806 are entry fields for inputting a user name and a password, respectively, to access a server designated by the host name input in the entry field 803.

When the OK button 807 is selected by the user, the CPU 201 stores the input setting value in the storage 204 as a new destination. When the cancel button 808 is selected by the user, the setting is discarded to cancel the address book registration.

FIG. 9 illustrates an example of a folder configuration of the file server 102 as a file transmission destination. A shared folder to be shared with the MFP 101 to store medical questionnaires is generated in the file server 102. A medical questionnaire folder 901 is a highest-order folder. Subfolders 902 to 904 for each patient identification (ID) are located below the medical questionnaire folder 901. Subfolders 905 and 906 for each hospital department are located below the patient ID folders. Medical questionnaire files 907 to 909 each having a file name indicated by a consultation date are located below the hospital department folders.

FIGS. 10 to 16 each illustrate an example where image data on a medical questionnaire generated by scanning a document is transmitted as a file with a file name "2018-09-05.pdf" from the MFP 101 to the otorhinolaryngology folder 906 which is present on the file server 102.

Figure 10:
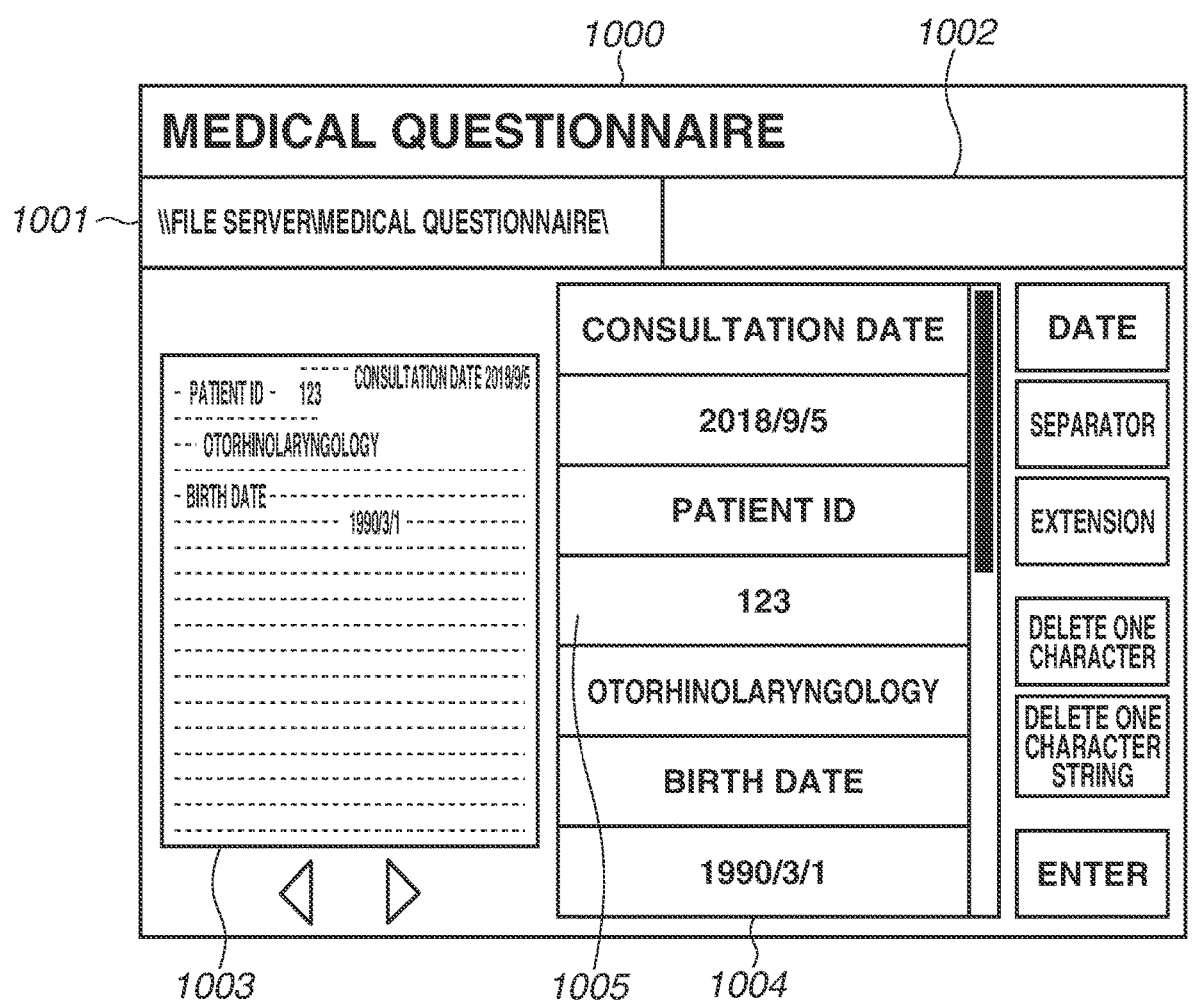
FIG. 10 illustrates an example of a screen to be displayed when one-touch transmission scan is executed.

FIG. 10 illustrates an example of a screen to be displayed when one-touch transmission scan is executed. A medical questionnaire screen 1000 illustrated in FIG. 10 is a screen to be shifted when the medical questionnaire button 405 is selected. Specifically, when the medical questionnaire button 405 on the home screen 400 is selected after the user sets a document on, for example, an auto document feeder (ADF), which is not illustrated, an image on the document is scanned based on the setting on the medical questionnaire button 405 to generate image data. After character recognition processing is performed on the generated image data, the medical questionnaire screen 1000 is displayed on the operation unit 205.

A destination (host name) on which the setting on the medical questionnaire button 405 is based is displayed in a base destination information display box 1001. In the case of the medical questionnaire button 405 according to the present exemplary embodiment, "\\file server\medical questionnaire" is displayed. The user cannot change the base destination on the medical questionnaire screen 1000.

A destination display box 1002 is a box in which an address that is input or selected by the user is displayed as a character string. The character string to be displayed in accordance with the input or selection by the user is updated. The character string to be displayed in the destination display box 1002 is stored in the RAM 203 as a folder name of a destination.

A preview image 1003 is generated by converting image data generated by scanning an image on a document into a raw image for display.

A text object list 1004 is a list of text objects each indicating one character string in each row (indicating a range from "consultation date" to "1990/3/1"). A text object refers to a button on which a character string is displayed. As a result of performing character recognition processing, characters located close to each other are interpreted as a single character string, and the character string is displayed as a text object. A method for generating the text object will be described with reference to FIG. 19. Characters to be displayed in the text object by the character recognition processing may include numbers. The character string indicated by the text object displayed in this case is associated with coordinates on the image of the document, and the character string is stored in the RAM 203. The user can select any text object from the text object list 1004. The character string indicated by the selected text object is set as a name of a folder in a hierarchy that is one level lower than the folder path displayed in the base destination information display box 1001, and the character string indicated by the selected text object is displayed in the destination display box 1002. For example, when the user selects a text object 1005 representing a character string indicating a patient ID "123", a screen such as a medical questionnaire screen 1100 illustrated in FIG. 11 is displayed as the medical questionnaire screen 1000.

Figure 11:
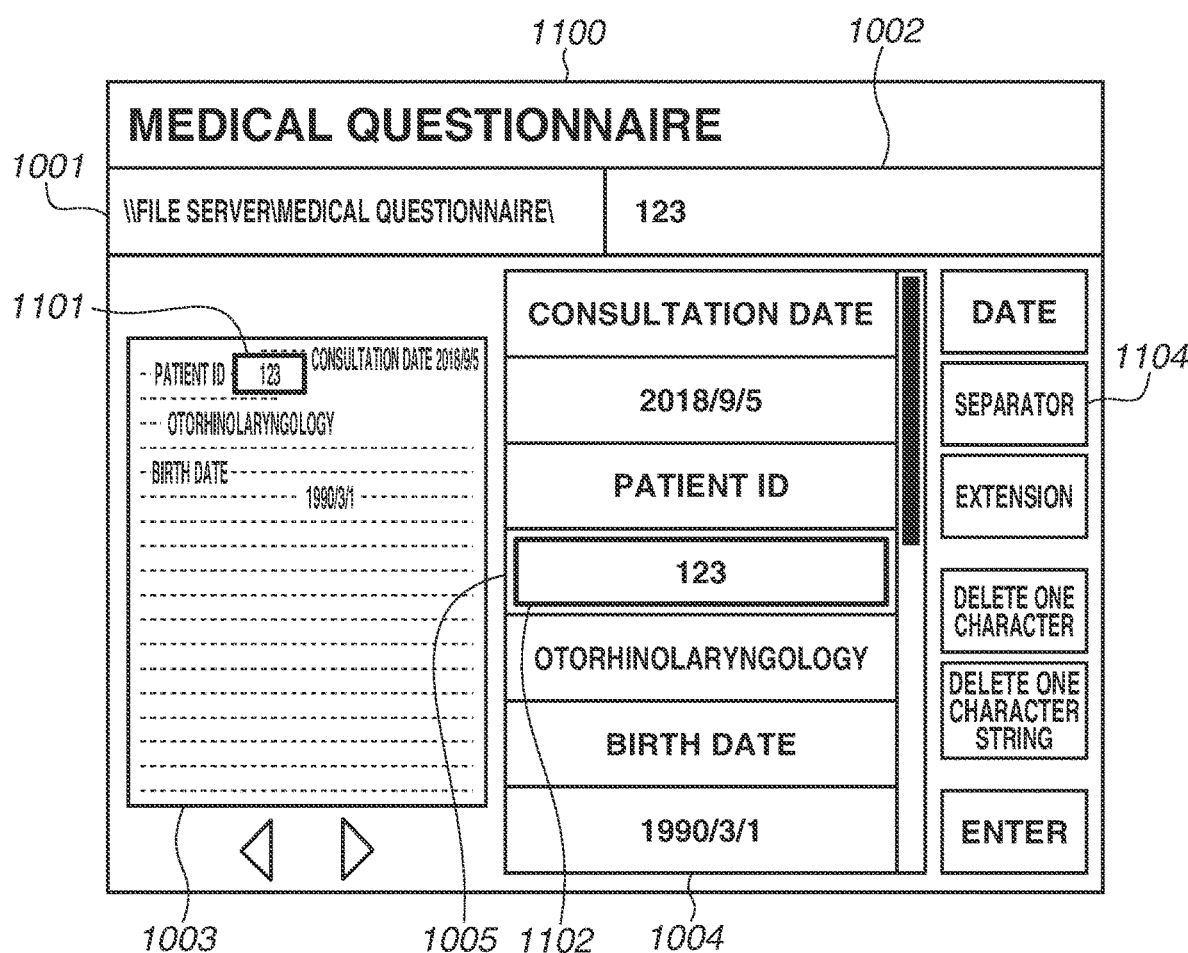
FIG. 11 illustrates an example of the screen to be displayed when one-touch transmission scan is executed.
Figure 12:
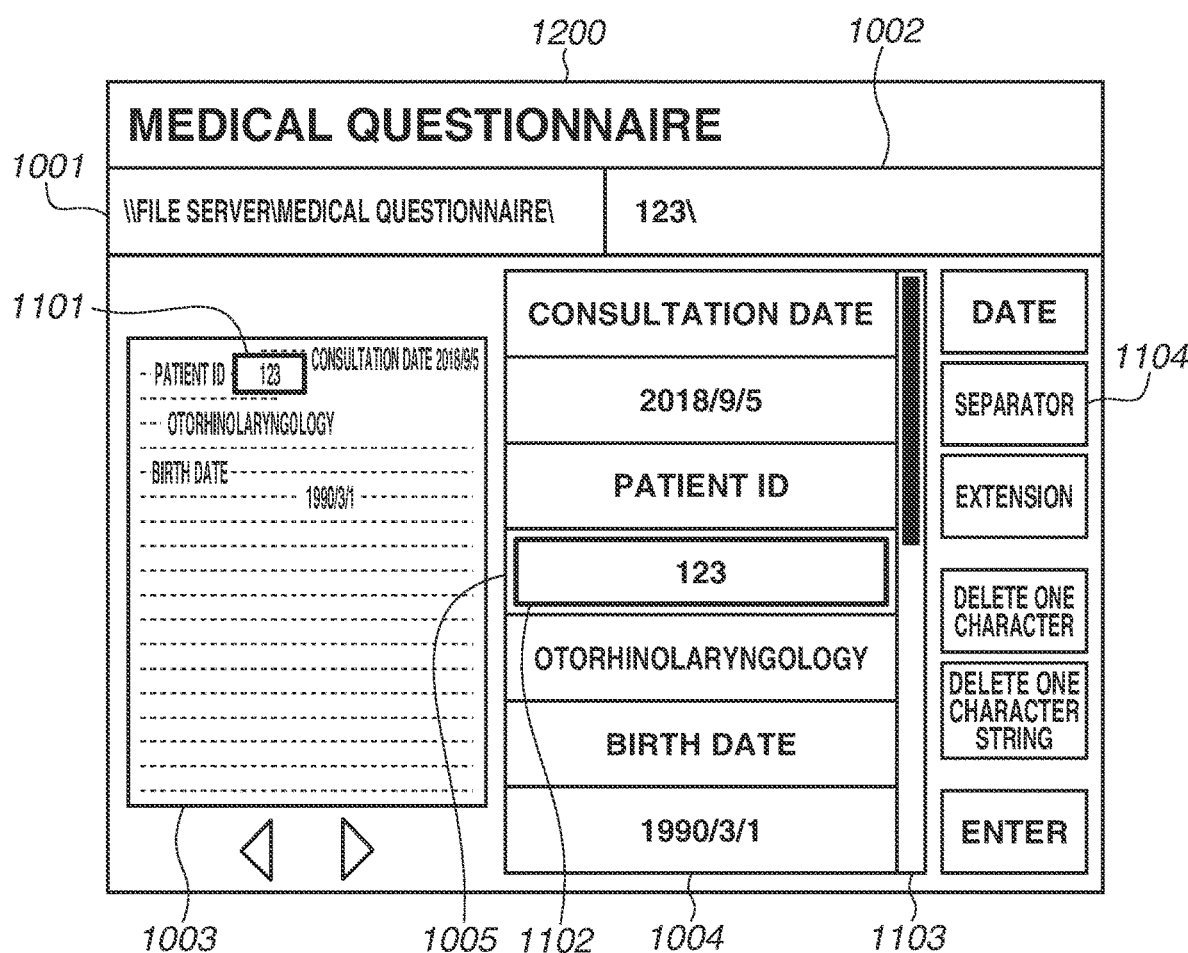
FIG. 12 illustrates an example of the screen to be displayed when one-touch transmission scan is executed.

FIG. 11 illustrates an example of a screen to be displayed when the one-touch transmission scan is executed. On the medical questionnaire screen 1100, the selected character string ("123") is displayed in the destination display box 1002. Further, an area indicated by coordinate information associated with the character string indicated by the selected text object is highlighted on the preview image 1003, as indicated by an area 1101. In addition, the character string in the text object list 1004 is highlighted as indicated by a highlight display 1102 so as to indicate that the character string is already selected.

When the selected character string is selected again, or when a cancel button 1603 to be described below is selected, the display of the character string in the destination display box 1002 and each highlight display are cancelled.

The present exemplary embodiment employs a method in which a tap operation on a text object is used as a selection operation by the user. However, a method of dragging and dropping a text object to the destination display box 1002 may also be employed.

When the medical questionnaire button 405 is selected and one-touch transmission scan is executed previously, the text object can be brought into a selected state by using a previous input history stored in the storage 204, and can be automatically displayed in the destination display box 1002. The storage and use of the input history will be described in detail below with reference to FIG. 20.

A scroll bar 1103 is used when text objects that cannot be displayed within the medical questionnaire screen 1100 are checked and selected.

A separator button 1104 is a button for adding a separator for a folder path to the destination display box 1002. When the separator button 1104 is selected in the state illustrated in FIG. 7, a separator "\" is added to the destination display box 1002 as indicated by a medical questionnaire screen 1200 illustrated in FIG. 12. The separator can be used any number of times, but cannot be continuously used without displaying a character string between separators. When the separator is continuously selected, a warning screen (not illustrated) indicating that the separator cannot be continuously used is displayed.

Figure 13:
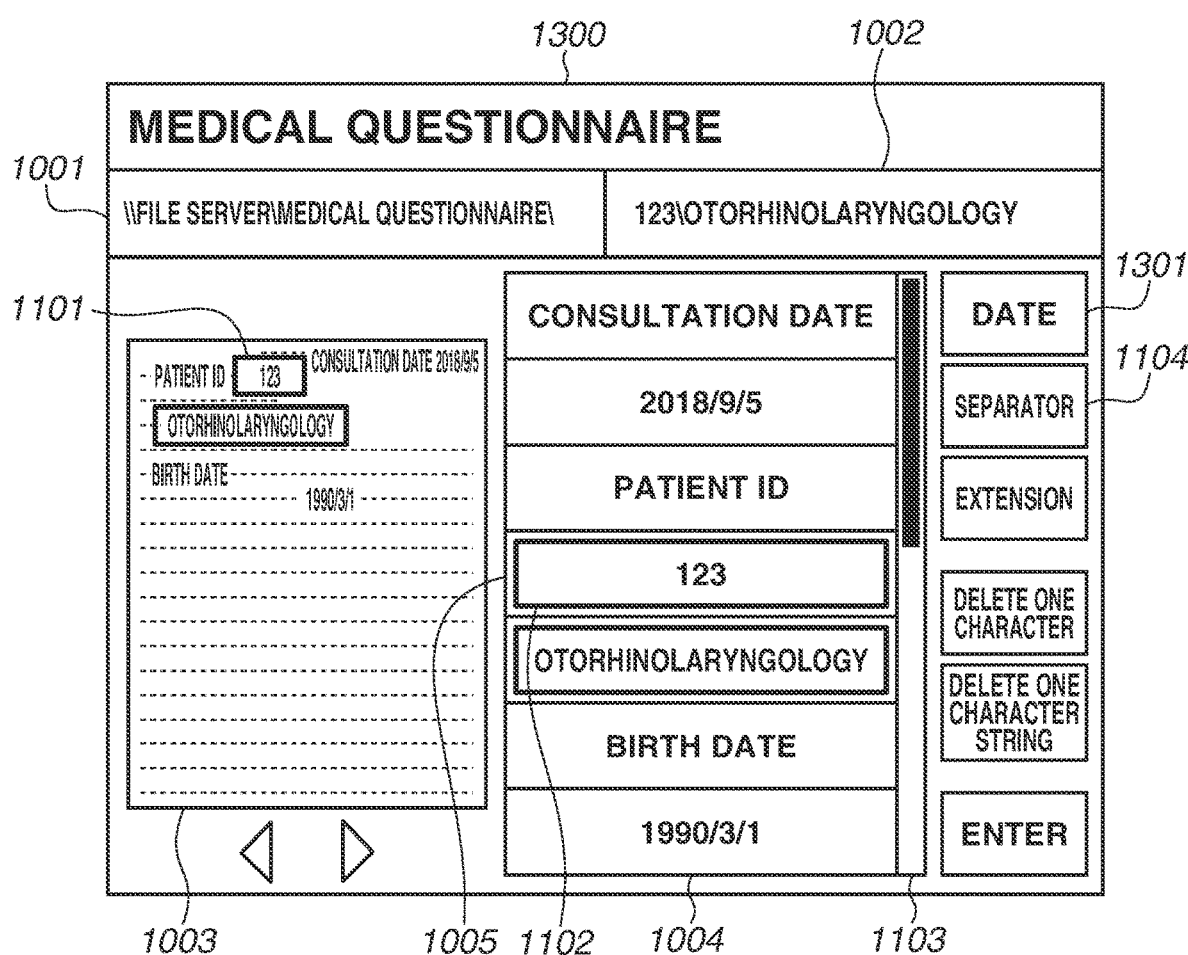
FIG. 13 illustrates an example of the screen to be displayed when one-touch transmission scan is executed.

FIG. 13 illustrates an example of a screen to be displayed when the one-touch transmission scan is executed. A medical questionnaire screen 1300 illustrated in FIG. 13 is a screen to be displayed when two types of text objects are selected.

When two text objects are selected, character strings indicated by text objects are displayed in the destination display box 1002 in the order of selection, as indicated by the medical questionnaire screen 1300. The medical questionnaire screen 1300 illustrates an example where a text object "otorhinolaryngology" is selected after the text object indicated by "123" is selected. Even when two or more text objects are selected, processing similar to that described above is performed. Specifically, when characters (text objects) are selected multiple times, a folder path based on a combination of selected characters is displayed in the destination display box 1002.

When two or more text objects are selected without selecting the separator button 1104, one folder name may be used for a combination of selected character strings, or the character string that is already selected and displayed may be deleted and replaced. Further, when two or more text objects are selected without selecting the separator button 1104, a separator may be automatically added between characters indicated by a text object, and characters indicated by a text object selected later may be used as the name of a folder in a lower hierarchy.

Even when a plurality of text objects is selected, each highlight display is performed in the same manner as described above.

A date button 1301 is a button for adding a character string indicating a selection date to the destination display box 1002. When the date button 1301 is selected in the state of the medical questionnaire screen 1300, a screen such as a medical questionnaire screen 1400 illustrated in FIG. 14 is displayed.

Figure 14:
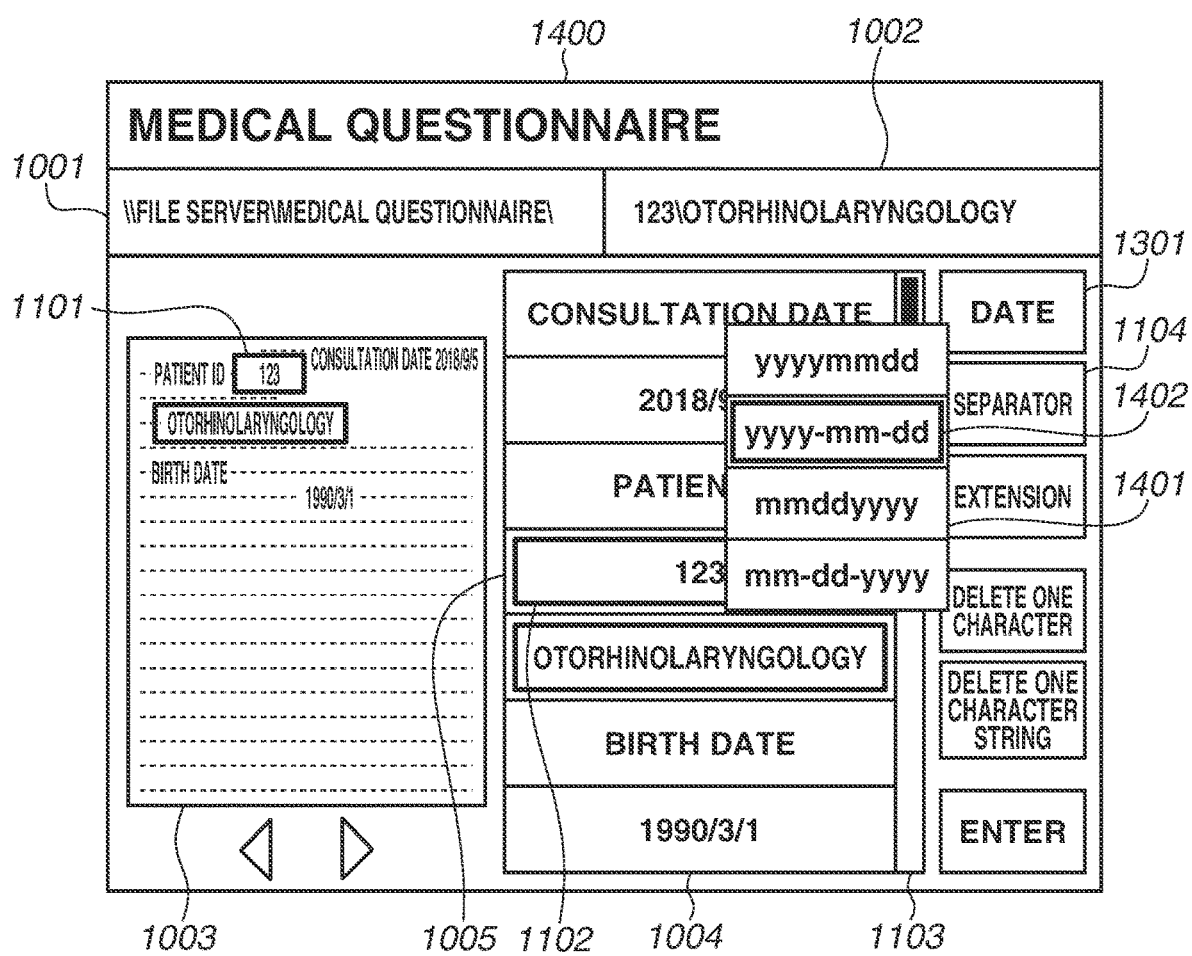
FIG. 14 illustrates an example of the screen to be displayed when one-touch transmission scan is executed.

FIG. 14 illustrates an example of a screen to be displayed when one-touch transmission scan is executed.

A pop-up 1401 is a pop-up screen (indicating a range from yyyymmdd to mm-dd-yyyy) for designating a format of a character string indicating a date. The user selects a date format from a list indicated by the pop-up 1401, so that the character string indicating the date represented by the selected format is additionally displayed in the destination display box 1002. A text object 1402 "yyyymmdd" is selected on the medical questionnaire screen 1400.

Figure 15:
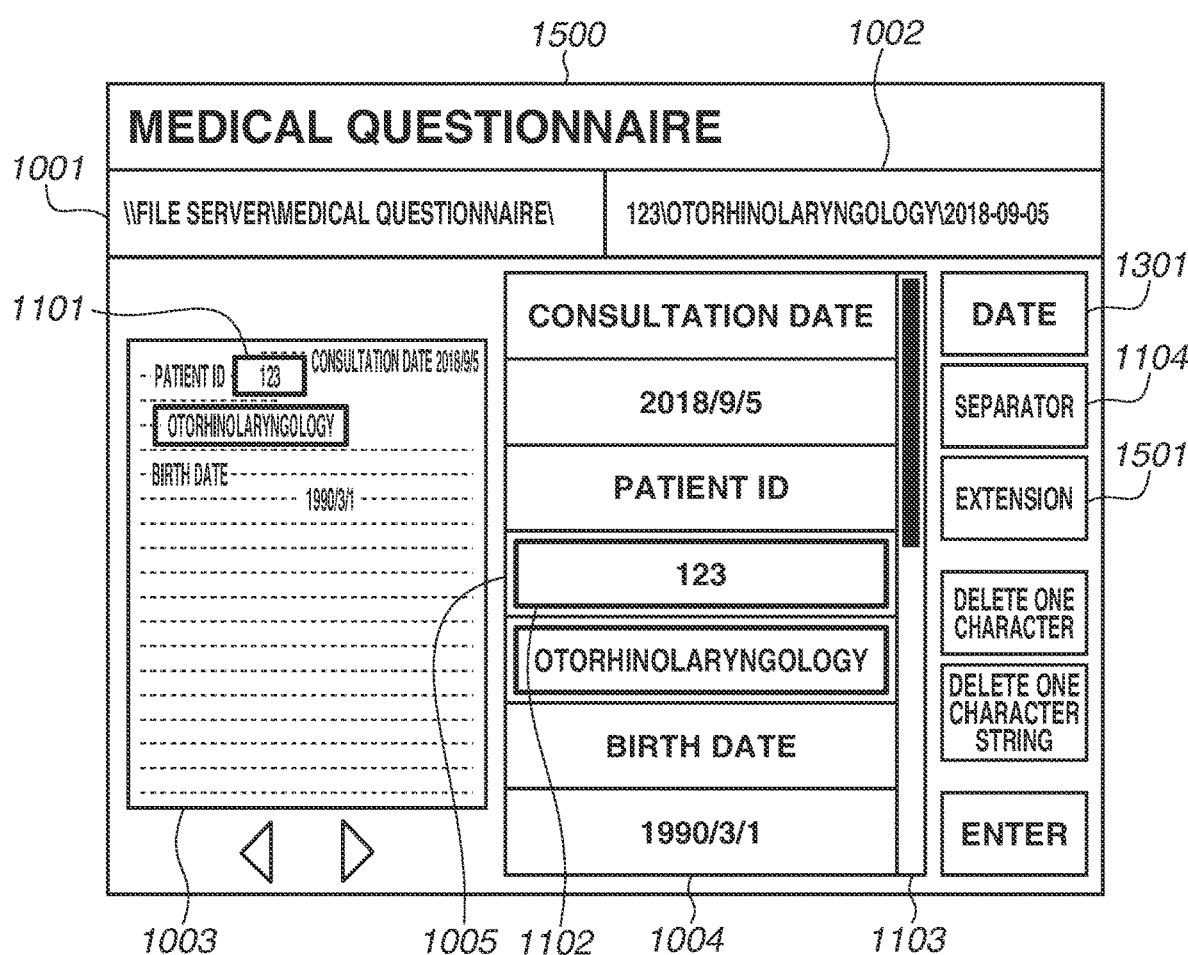
FIG. 15 illustrates an example of the screen to be displayed when one-touch transmission scan is executed.

FIG. 15 illustrates an example where the character string indicating the date is additionally displayed. FIG. 15 illustrates an example of a screen to be displayed when one-touch transmission scan is executed. Since the text object 1402 indicating "yyyy-mm-dd" is selected on the medical questionnaire screen 1400, a character string "2018-09-05" is additionally displayed after "123\otorhinolaryngology\". In this case, a character string indicating a folder path "123\otorhinolaryngology\2018-09-05" to which the character string "2018-09-05" is added is stored in the RAM 203.

Since the date button 1301 can be used any number of times, the state of the date button 1301 does not change to the selected state in the display.

In the present exemplary embodiment, since the date is often used as a folder name or a file name, a dedicated button is prepared to accept the input of the date. However, a dedicated button, such as a time button, may be prepared separately from the date button 1301, if any character string other than the date is frequently used.

The extension button 1501 is a button for adding a character string indicating an extension to the characters indicating the name of a folder in a lowermost layer of the folder path displayed in the destination display box 1002. When the extension button 1501 is selected in the state of the medical questionnaire screen 1500, a screen such as a medical questionnaire screen 1600 illustrated in FIG. 16 is displayed.

Figure 16:
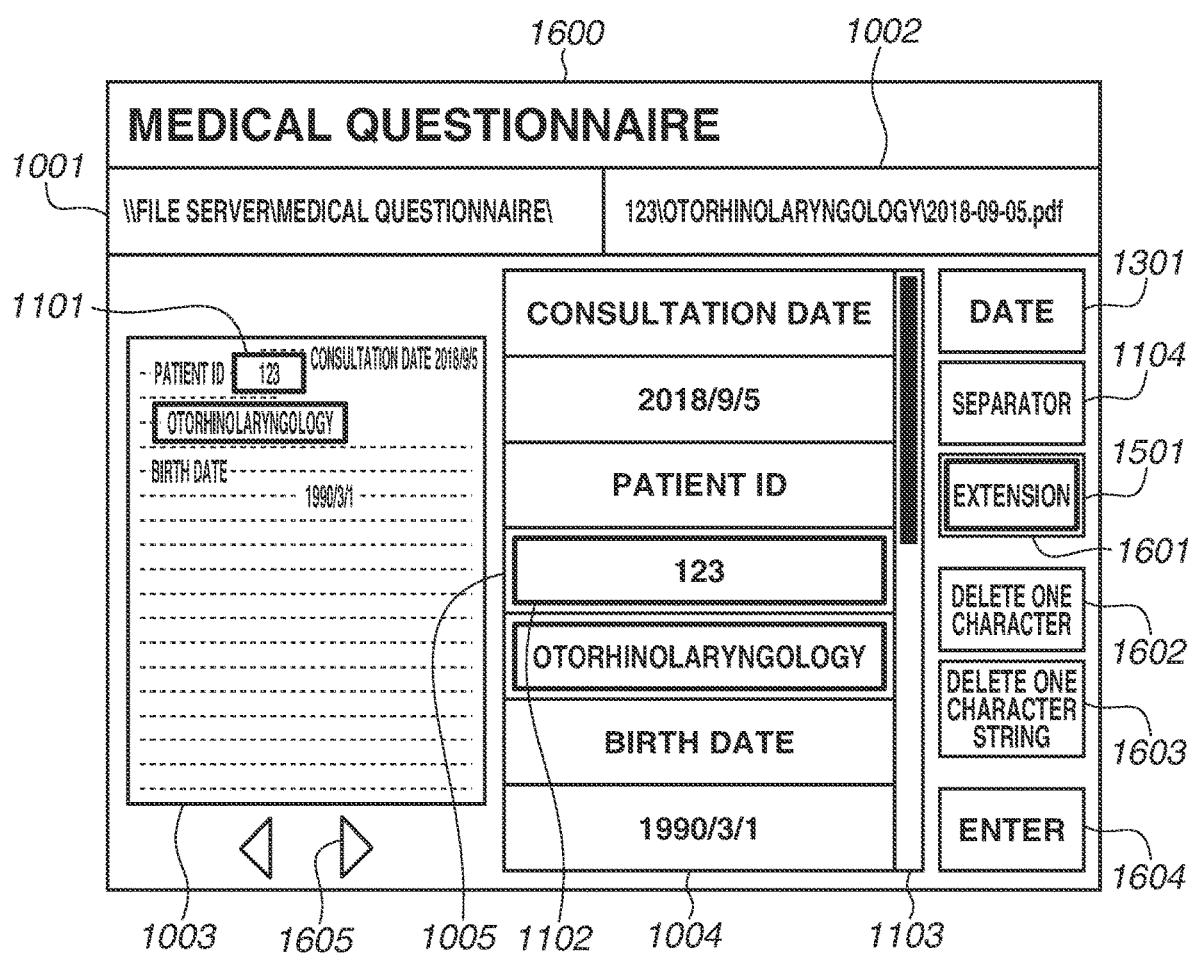
FIG. 16 illustrates an example of the screen to be displayed when one-touch transmission scan is executed.

FIG. 16 illustrates an example of a screen to be displayed when one-touch transmission scan is executed. A file path obtained by adding ".pdf" to "123\otorhinolaryngology\2018-09-05" to be displayed is displayed in the destination display box 1002 on the medical questionnaire screen 1600. In this case, an extension based on the file format set in the pull-down 611 is added.

When the extension button 1501 is selected and the character string indicating the extension is added to the destination display box 1002, highlight display is performed as indicated by a highlight display 1601. In the case of cancelling the selected state, the selected state can be cancelled by the same method as the method of cancelling the selected state of the text object as described above. When a new character string is added in a state where the extension button 1601 is already selected, a warning screen (not illustrated) indicating that the extension is already input is displayed.

A character delete button 1602 is a button for deleting the last one character of the character string displayed in the destination display box 1002. For example, when the character delete button 1602 is selected from the state illustrated in FIG. 16, a character string "123\otorhinolaryngology\2018-09-05.pd" is displayed in the destination display box 1002. One character is also deleted from the character string stored as the folder path in the RAM 203.

The cancel button 1603 is a button for deleting the last input character string when the cancel button 1603 is selected. If "select an object from the text object list 1004" or "select the extension button 1501" is last input, the highlight display and the selected state on the preview image 1003 are cancelled. For example, when the cancel button 1603 is selected from the state illustrated in FIG. 16, a character string "123\otorhinolaryngology\2018-09-05" is displayed in the destination display box 1002. When the cancel button 1603 is selected again, a character string "123\otorhinolaryngology\" is displayed in the destination display box 1002.

An enter button 1604 is a button for combining the character string of the base destination with the character string displayed on the destination display box 1002, setting the folder indicated by the combined character string as a transmission destination, and starting the transmission of image data when the enter button 1604 is selected.

A next-page button 1605 is a button for displaying a preview image to be displayed on the medical questionnaire screen 1600 and an image on another page of the document obtained by scanning the text object list 1004 when the next-page button 1605 is selected.

As described above, the user can easily designate the transmission destination in a plurality of hierarchies only by selecting an object or a button, without the need for manually inputting a character string through a keyboard or the like.

Figure 17:
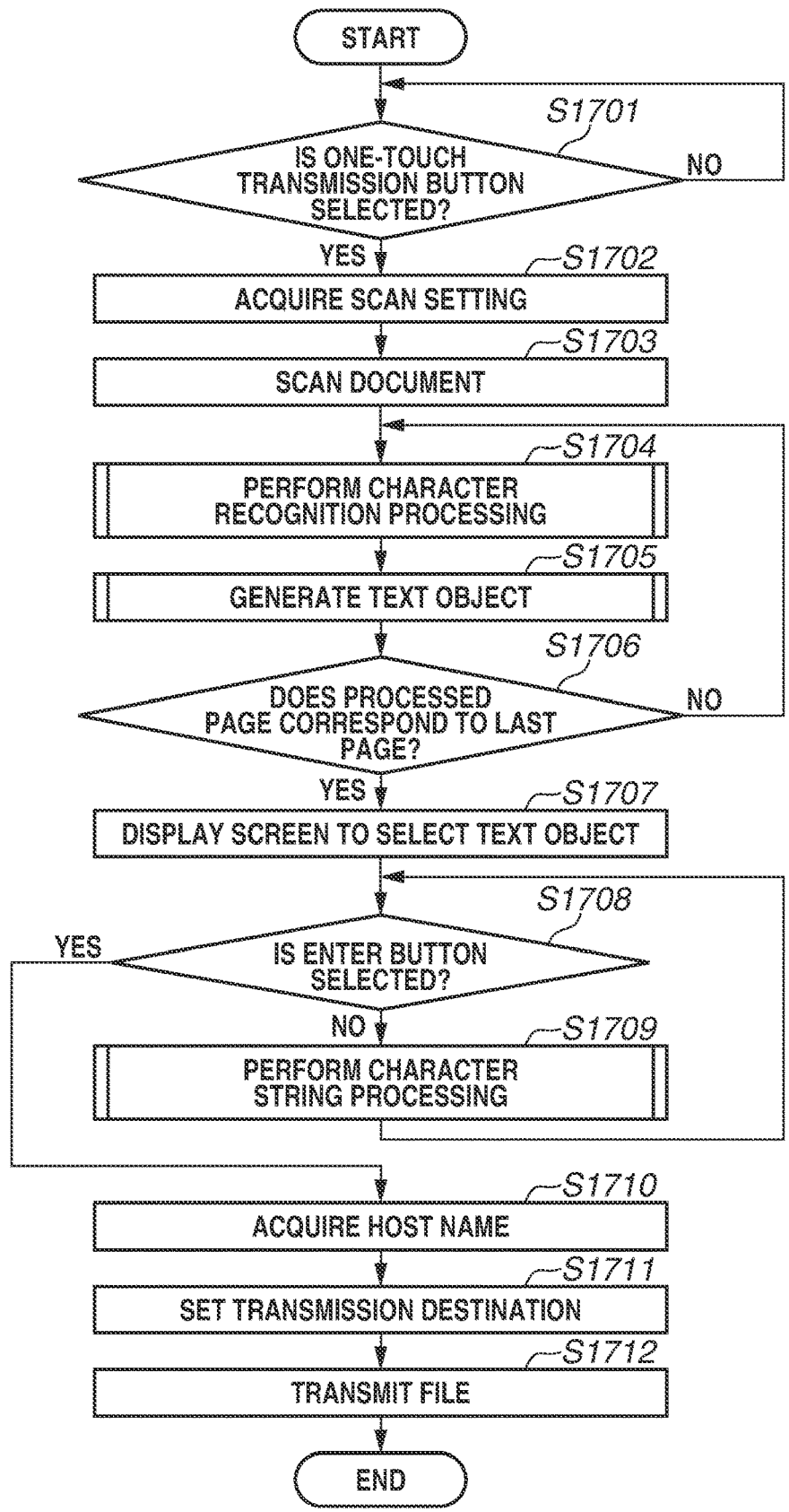
FIG. 17 is a flowchart illustrating an example of a processing flow to be executed when a one-touch transmission button for file transmission is selected.

FIG. 17 is a flowchart for implementing the processing described above with reference to FIGS. 10 to 16, and illustrates an example of a processing flow to be executed when the one-touch transmission button for file transmission is selected. The CPU 201 reads a program stored in the ROM 202 into the RAM 203 and executes the read program, thereby implementing the processing illustrated in the flowchart of FIG. 17. The processing flow illustrated in FIG. 17 is started when the MFP 101 is powered on.

In step S1701, the CPU 201 determines whether the one-touch transmission button is selected. If the one-touch transmission button is selected (YES in step S1701), the processing proceeds to step S1702. If the one-touch transmission button is not selected (NO in step S1701), the processing returns to step S1701. A case where the medical questionnaire button 405 is selected as the one-touch transmission button will now be described.

In step S1702, the CPU 201 reads the scan setting corresponding to the medical questionnaire button 405 set on the button setting edit screen 600 from the storage 204.

In step S1703, the CPU 201 controls the scanner 207 based on the scan setting read in step S1402 to scan an image of a document and generate image data.

In step S1704, the CPU 201 executes character recognition processing using the generated image data. The character recognition processing will be described in detail below with reference to FIG. 15.

Figure 18:
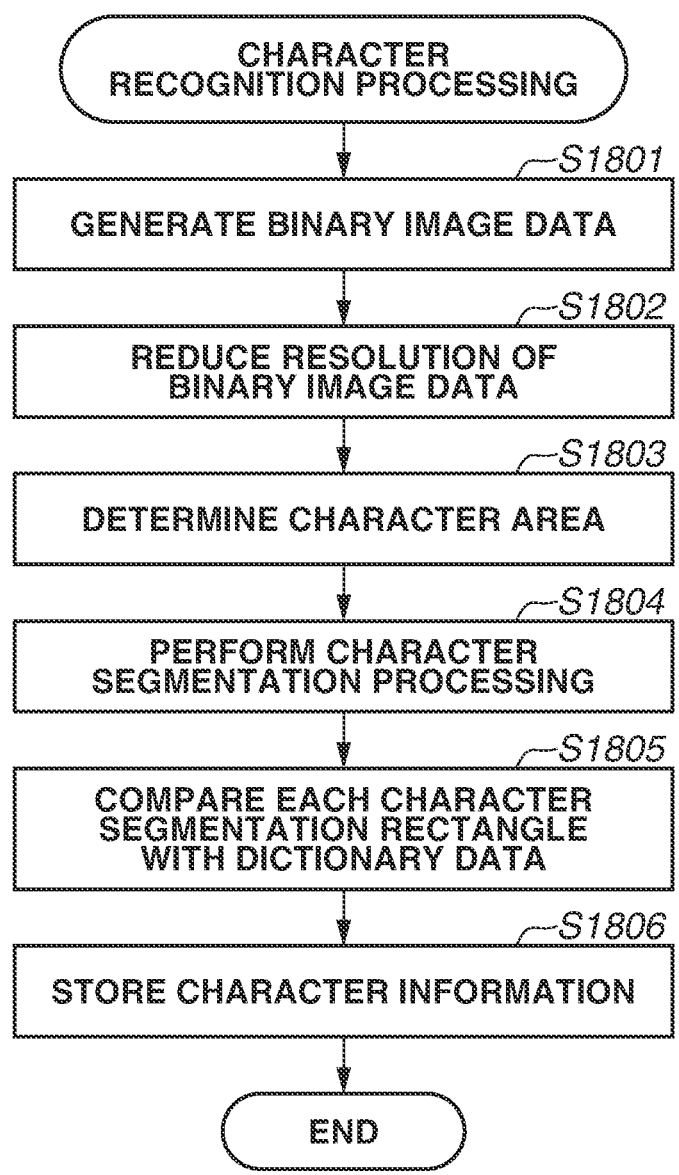
FIG. 18 is a flowchart illustrating an example of character recognition processing.

FIG. 18 is a flowchart illustrating an example of the character recognition processing. The CPU 201 reads a program stored in the ROM 202 into the RAM 203 and executes the read program, thereby implementing the processing illustrated in the flowchart of FIG. 18.

In step S1801, the CPU 201 generates binary image data using the image data generated in step S1703. The generated binary image data is stored in the RAM 203.

In step S1802, the CPU 201 reduces the resolution of the binary image data generated in step S1801. A processing load of searching for a character area from the binary image data can be reduced by reducing the resolution of the binary image data.

In step S1803, the CPU 201 searches for a character area in an image indicated by the binary image data whose resolution is reduced. In this case, the character area may be searched from the entire area of the image data, or may be searched from an area set by the user.

In step S1804, the CPU 201 executes character segmentation processing on the area determined to be the character area in step S1803. The character segmentation processing refers to processing for segmenting a circumscribed rectangle of each character as a character segmentation rectangle based on lateral projection and longitudinal projection. The character segmentation processing is executed on all areas determined to be the character area.

In step S1805, the CPU 201 compares each character segmentation rectangle with dictionary data stored in the ROM 202, and acquires a character code representing a most similar character and coordinate information about the character segmentation rectangle. The dictionary comparison processing is executed on all character segmentation rectangles. In this processing, font information or the like may be acquired in addition to the character code and coordinate information.

In step S1806, the CPU 201 stores the character code and coordinate information as the character information acquired in step S1805 in the RAM 203.

Referring again to the processing flow illustrated in FIG. 17, in step S1705, the CPU 201 generates a text object using the character information. Processing for generating the text object will be described in detail with reference to FIG. 19.

Figure 19:
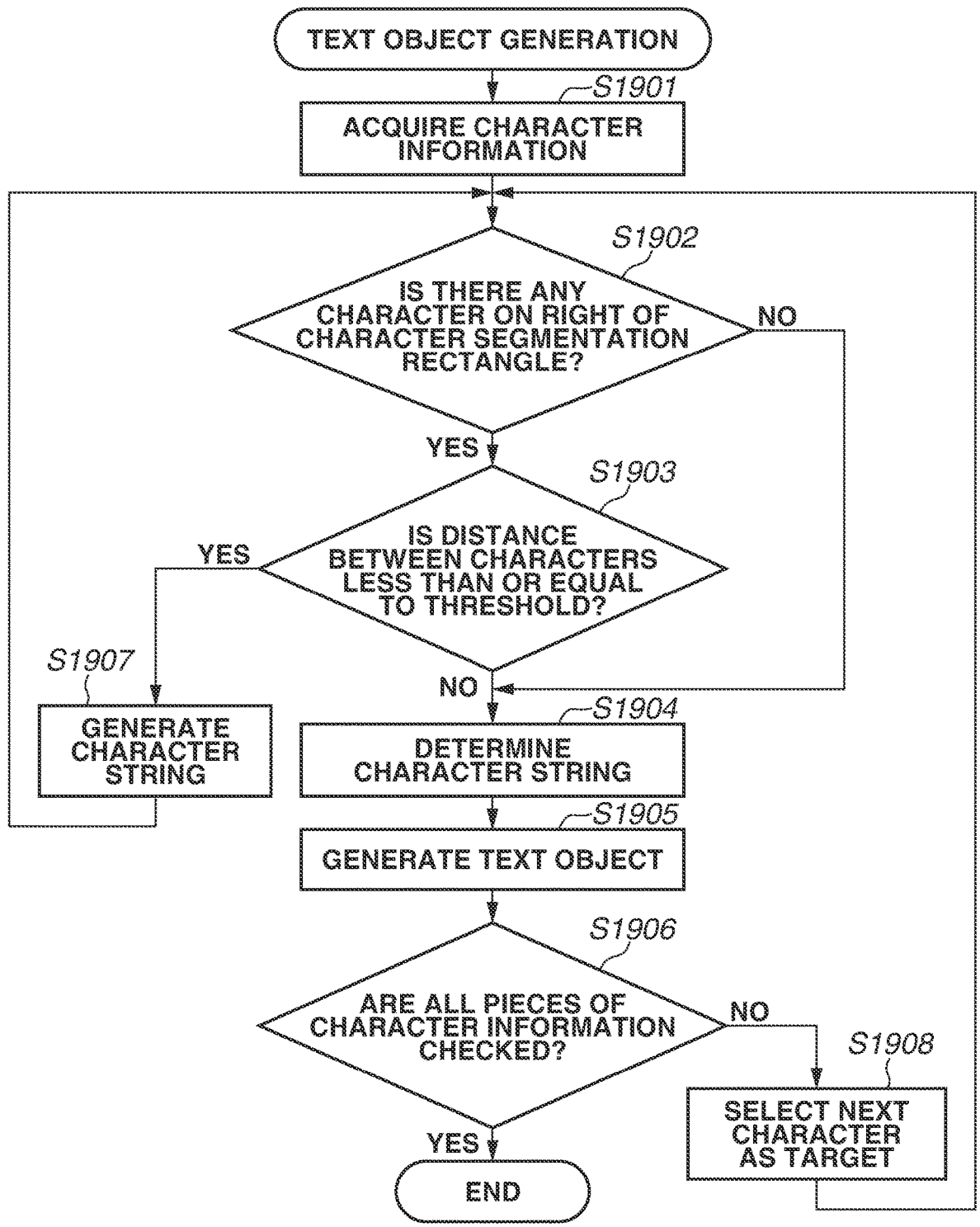
FIG. 19 is a flowchart illustrating an example of a processing flow for the MFP to generate a text object.

FIG. 19 is a flowchart illustrating an example of a processing flow for the MFP 101 to generate a text object. The CPU 201 reads a program stored in the ROM 202 into the RAM 203 and executes the read program, thereby implementing the processing illustrated in the flowchart of FIG. 19. The processing flow illustrated in FIG. 19 is started when the character recognition processing corresponding to one page is completed in step S1704.

In step S1901, the CPU 201 acquires the character information stored in step S1806. In step S1902, the CPU 201 determines a character segmentation rectangle at upper-leftmost coordinates of the image indicated by the image data, and determines whether a character (character segmentation rectangle) is present on the right of the character segmentation rectangle. If it is determined that a character (character segmentation rectangle) is present (YES in step S1902), the processing proceeds to step S1903. If it is determined that a character (character segmentation rectangle) is not present (NO in step S1902), the processing proceeds to step S1904.

In step S1903, the CPU 201 determines whether a distance from the character (character segmentation rectangle) present on the right of the character segmentation rectangle is less than or equal to a threshold. If it is determined that the distance is less than or equal to the threshold (YES in step S1903), the processing proceeds to step S1907. If it is determined that the distance is more than or equal to the threshold (NO in step S1903), the processing proceeds to step S1904.

In step S1907, the CPU 201 combines a target character with a character present on the right of the target character to generate a character string. After that, the character present on the right of the target character is selected as a target character, and then the processing returns to step S1902.

In step S1904, the CPU 201 stores a single character string or a combination of character strings in the RAM 203 as a character string to be used for a text object.

In step S1905, the CPU 201 generates a text object by using the character string stored in the RAM 203 in step S1904. The text object used herein refers to a button on which a character string is displayed.

In step S1906, the CPU 201 determines whether all pieces of character information are checked. If it is determined that all pieces of character information are checked (YES in step S1906), the processing is terminated. If it is determined that not all pieces of character information are checked (NO in step S1906), the processing proceeds to step S1908.

In step S1908, the CPU 201 selects the next character as a target, and then the processing returns to step S1602. When the processing returns to step S1902, a character present on the right of the previously-selected character is selected as the next character. After a character present at a right end is checked, a character present at a left end in a row below the row in which the character at the right end is present is selected as the next character.

Referring again to the processing flow illustrated in FIG. 17, in step S1706, it is determined whether the page on which character recognition processing and text object generation processing are executed corresponds to the image of the last page in the image scanned in step S1703. If it is determined that the page corresponds to the last page (YES in step S1706), the processing proceeds to step S1707. If it is determined that the page does not correspond to the last page (NO in step S1706), the next page is set as the target, and then the processing returns to step S1704.

In step S1707, the CPU 201 displays a screen for selecting a text object. The screen to be displayed in this case is illustrated in FIG. 10. In a destination display box on the screen displayed in this case, a character string indicating a folder path may be automatically displayed based on coordinate information and separator and extension information stored in step S1711 to be described below. For example, when the text object "123" illustrated in FIG. 10 is selected in the previous processing and transmission processing is executed, the character recognition processing is executed on the area indicated by the coordinate information "123", and the recognized character string is displayed in the destination display box 1002. Further, if a separator or extension is selected in the previous processing, the presence or absence of the separator or extension and an area where the separator or extension is inserted are stored (in the case of FIG. 16, information indicating that a separator is added to the end of each of "123" and "otorhinolaryngology" and an extension is added to the end of "2018-09-05" is stored).

In step S1708, the CPU 201 determines whether the enter button 1604 is selected. If it is determined that the enter button 1604 is selected (YES in step S1708), the processing proceeds to step S1710. If it is determined that the enter button 1604 is not selected (NO in step S1708), the processing proceeds to step S1709.

In step S1709, the CPU 201 executes character string processing. The character string processing will be described in detail with reference to FIG. 20.

Figure 20:
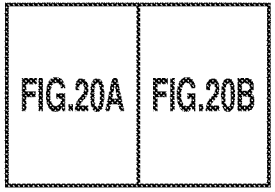
FIG. 20, FIG. 20A and FIG. 20B are flowcharts illustrating an example of a character string processing flow.
Figure 20A:
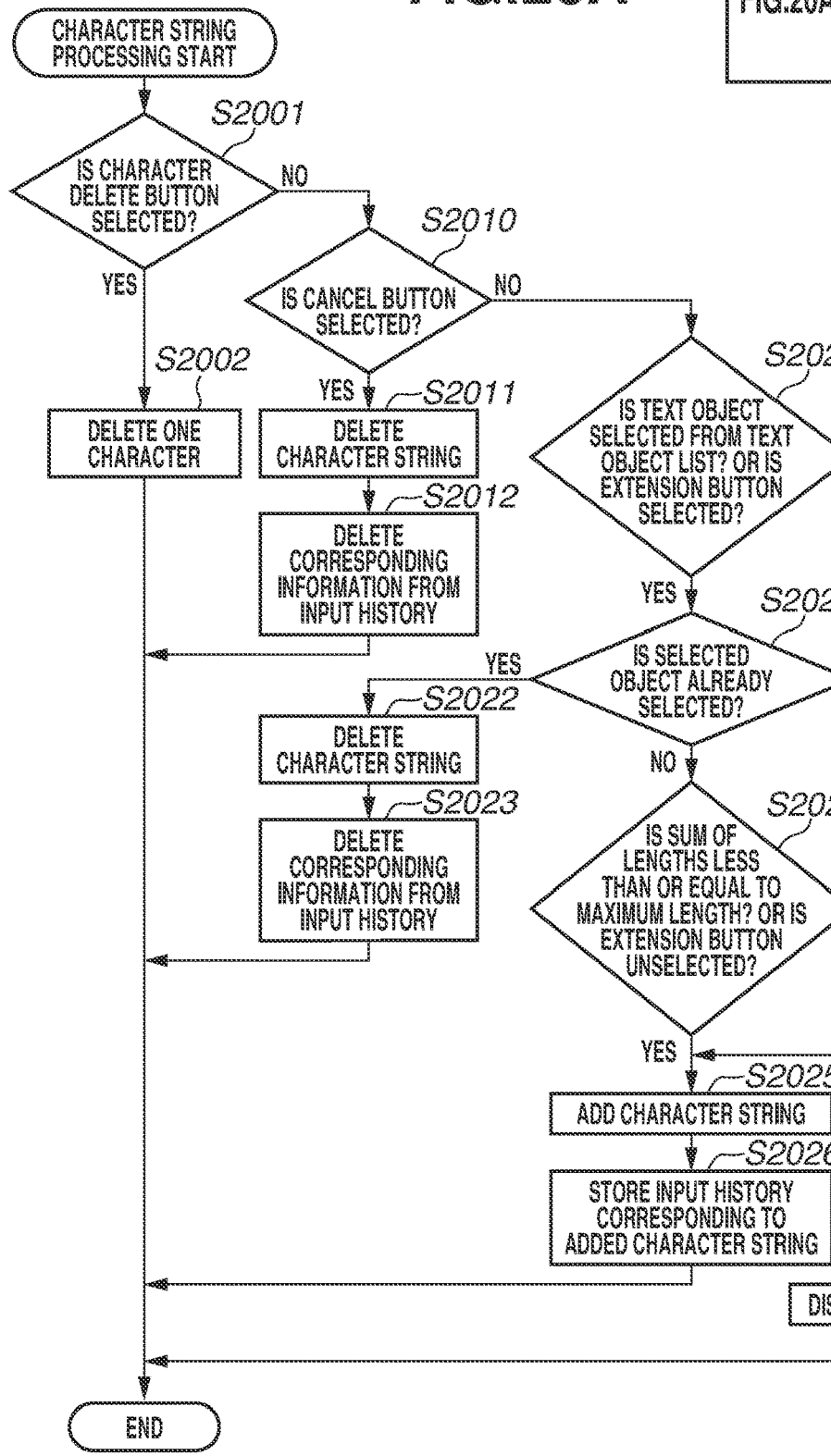
Figure 20B:
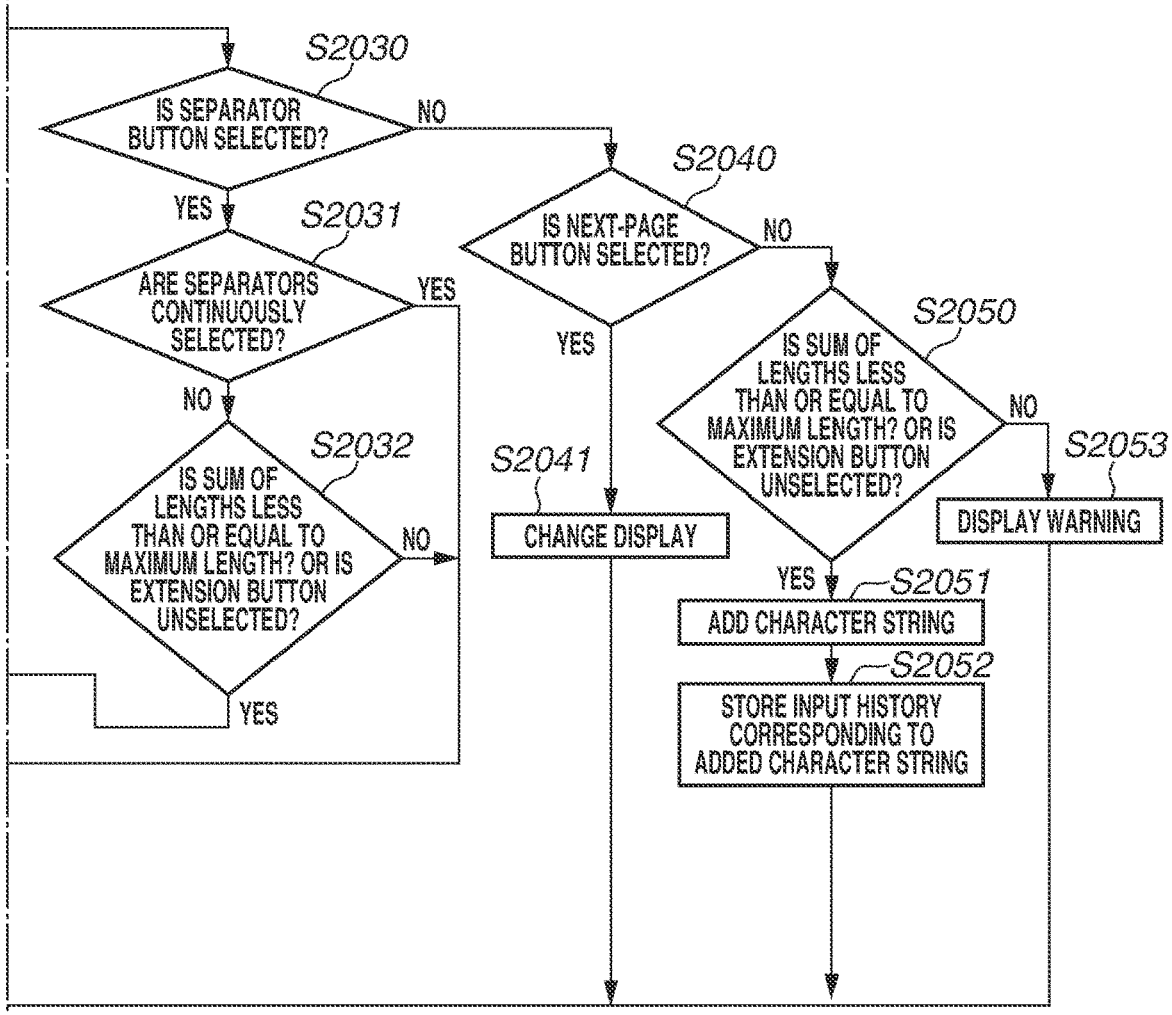

FIG. 20 is a flowchart illustrating an example of a character string processing flow. The CPU 201 reads a program stored in the ROM 202 into the RAM 203 and executes the read program, thereby implementing the processing illustrated in the flowchart of FIG. 20. The processing flow illustrated in FIG. 20 is started when it is determined that the enter button 1604 is not selected in step S1708.

In step S2001, the CPU 201 determines whether the character delete button 1602 is selected. If it is determined that the character delete button 1602 is selected (YES in step S2001), the processing proceeds to step S2002. If it is determined that the character delete button 1602 is not selected (NO in step S2001), the processing proceeds to step S2010.

In step S2002, the CPU 201 deletes the last character of the character string displayed in the destination information box. Processing similar to that described above is also performed on the character string stored in the RAM 203. Then, the processing is terminated.

In step S2010, the CPU 201 determines whether the cancel button 1603 is selected. If it is determined that the cancel button 1603 is selected (YES in step S2010), the processing proceeds to step S2011. If it is determined that the cancel button 1603 is not selected (NO in step S2010), the processing proceeds to step S2020.

In step S2011, the CPU 201 deletes one of the character strings displayed in the destination display box. The CPU 201 can also delete separators and extensions. Processing similar to that described above is also performed on the character string stored in the RAM 203.

In step S2012, the CPU 201 deletes coordinate information, information indicating the presence or absence of a separator, and extension information, which are stored in the storage 204 as the input history, based on the character string deleted in step S2011. Then, the processing is terminated.

In step S2020, the CPU 201 determines whether a text box is selected from the text object list 1004, and also determines whether the extension button 1501 is selected. If a text object is selected, or if the extension button 1501 is selected (YES in step S2020), the processing proceeds to step S2021. If no text object is selected, or if the extension button 1501 is not selected (NO in step S2020), the processing proceeds to step S2030.

In step S2021, the CPU 201 determines whether the selected object is already selected. Further, the CPU 201 determines whether the selected extension button 1501 is already selected. If it is determined that the text object or the extension button 1501 is already selected (YES in step S2021), the processing proceeds to step S2022. If it is determined that the text object or the extension button 1501 is not already selected (NO in step S2021), the processing proceeds to step S2024.

In step S2022, the CPU 201 deletes the character string corresponding to the selected text object or extension button 1501 from the destination information box. The character string stored in the RAM 203 is also deleted in the same manner In step S2023, the CPU 201 deletes the coordinate information and extension information, which are stored in the storage 204 as the input history, based on the character string deleted in step S2022. Then, the processing is terminated.

In step S2024, the CPU 201 determines whether the sum of the length of the character string displayed in the destination display box 1002 and the length of the character string selected by the user is less than or equal to a maximum length, and also determined whether the extension button 1501 is selected. If it is determined that the sum of the lengths of the character strings is less than or equal to the maximum length and that the extension button 1501 is unselected (YES in step S2024), the processing proceeds to step S2025. If it is not determined that the sum of the lengths of the character strings is less than or equal to the maximum length and that the extension button 1501 is unselected (NO in step S2024), the processing proceeds to step S2027. The maximum length may be determined based on constraints on the implementation of the MFP 101 and constraints on the file path for the file server 102, or a setting made by the user may be accepted.

In step S2025, the CPU 201 connects, to the end of the character string displayed in the destination display box, the character string corresponding to the selected text object, an extension, in a case where the extension button 1501 is selected, and a separator, in a case where the separator button 1104 is selected. Similarly, the character string, the extension, or the separator is connected to the end of the character string stored in the RAM 203 at the time, and the character string to which the extension or separator is connected is stored in the RAM 203.

In step S2026, the CPU 201 stores the input history corresponding to the character string added in step S2025 in the storage 204.

In step S2027, upon determining that the user's selection conflicts the constraints on any one of the maximum length, the separator, and the extension, the CPU 201 displays a warning screen (not illustrated) depending on the conflicting constraints. In the present exemplary embodiment, a tap operation to be performed by the user is used as a method for terminating the display of the warning screen. Alternatively, a configuration in which the display is automatically terminated after a lapse of a predetermined period (e.g., one second) may be used.

In step S2030, the CPU 201 determines whether the separator button 1104 is selected. If it is determined that the separator button 1104 is selected (YES in step S2030), the processing proceeds to step S2031. If it is determined that the separator button 1104 is not selected (NO in step S2030), the processing proceeds to step S2040.

In step S2031, the CPU 201 determines whether the separator is continuously selected. If it is determined that the separator is continuously selected (YES in step S2031), the processing proceeds to step S2027. If it is determined that the separator is not continuously selected (NO in step S2031), the processing proceeds to step S2032.

In step S2032, the CPU 201 determines whether the sum of the length of the character string displayed in the destination display box 1002 and the length of the character string selected by the user is less than or equal to the maximum length, and also determines whether the extension button 1501 is selected. If it is determined that the sum of the lengths of the character strings is less than or equal to the maximum length and that the extension button 1501 is unselected (YES in step S2032), the processing proceeds to step S2025. If it is not determined that the sum of the lengths of the character strings is less than or equal to the maximum length and that the extension button 1501 is unselected (NO in step S2032), the processing proceeds to step S2027.

In step S2040, the CPU 201 determines whether the next-page button 1605 is selected by the user. If it is determined that the next-page button 1605 is selected by the user (YES in step S2040), the processing proceeds to step S2041. If it is determined that the next-page button 1605 is not selected by the user (NO in step S2040), since the date button 1301 is selected, the processing proceeds to step S2050.

In step S2041, the CPU 201 displays a preview image to be displayed on the medical questionnaire screen and an image on another page of a document obtained by scanning the text object list 1004. When a right button is selected, the page which is one page after the page currently displayed is displayed, and when a left button is selected, the page which is one page before the page currently displayed is displayed. Then, the processing is terminated.

In step S2050, the CPU 201 determines whether the sum of the length of the character string displayed in the destination display box 1002 and the length of the character string selected by the user is less than or equal to the maximum length, and also determines whether the extension button 1501 is selected. If it is determined that the sum of the lengths of the character strings is less than or equal to the maximum length and that the extension button 1501 is unselected (YES in step S2050), the processing proceeds to step S2051. If it is not determined that the sum of the lengths of the character strings is less than or equal to the maximum length and that the extension button 1501 is unselected (NO in step S2050), the processing proceeds to step S2053.

In step S2051, since the date button 1301 and the pop-up 1401 are selected, the CPU 201 displays the selection date by connecting the selection date to the end of the character string displayed in the destination information box based on the selected date format. Similarly, the selection date is connected to the end of the character string stored in the RAM 203 at the time, and the character string to which the selection date is connected is stored in the RAM 203.

In step S2052, the CPU 201 stores the input history corresponding to the character string added in step S2051 in the storage 204.

In step S2053, the CPU 201 executes processing similar to that of step S2027.

Referring again to the processing flow illustrated in FIG. 17, in step S1710, the CPU 201 acquires a host name (folder path) displayed in the base destination information display box 1001 and stores the acquired host name in the RAM 203. In the case of FIG. 16, "\\file server\medical questionnaire" is acquired. In step S1711, the CPU 201 combines the folder path acquired in step S1711 with the character string stored in the RAM 203 in step S1709, and sets the folder path as the transmission destination of the image data generated in step S1703. In the case of FIG. 16, "\\file server\medical questionnaire\123\otorhinolaryngology\2018-09-05.pdf" is set. In this case, "2018-09-05.pdf" is set as a file name and the file with the file name "2018-09-05.pdf" is transmitted to "\\file server\medical questionnaire\123\otorhinolaryngology". If no file name is set, the date, time, and the like may be automatically added as the file name In step S1712, the CPU 201 transmits the file generated by converting image data into a file to the destination set in step S1711.

The execution of the processing described above makes it possible to reduce the time and labor required for the user to set a folder path composed of a plurality of hierarchies for a folder to which image data is transmitted.

The exemplary embodiments described above illustrate an example where when the one-touch transmission button is selected, image data is generated by scanning an image on a document and character recognition processing and text object generation processing are executed on the image data. However, the present disclosure is not limited to this example. For example, the MFP 101 may receive image data transmitted from an external device, execute character recognition processing and text object generation processing on the image data, and display a screen as illustrated in FIG. 10. When the scan button 402 is selected, image data may be generated by scanning an image on a document, and character recognition processing and text object generation processing may be executed on the image data.

The exemplary embodiments described above illustrate an example where a setting screen, such as the button setting edit screen 600, is displayed on the display device 311 connected to the PC 104 by HTTP connection. However, the present disclosure is not limited to this example. For example, the setting screen, such as the button setting edit screen 600, may be displayed on the touch panel 410 on the operation unit 205 of the MFP 101 to accept an operation.

Other Exemplary Embodiments

An object of the present disclosure is attained by executing the following processing. That is, a storage medium recording a program code for implementing functions according to the exemplary embodiments described above is supplied to a system or an apparatus, and a computer (or a CPU, a micro processing unit (MPU), etc.) of the system or the apparatus reads the program code stored in the storage medium. In this case, the program code read from the storage medium implements functions according to the exemplary embodiments described above, and the program code constitutes the present disclosure.

The present disclosure also includes a case where the functions according to the exemplary embodiments described above are implemented by executing the program code read by the computer. In addition, the present disclosure also includes a case where a part or all of the actual processing is performed by an OS or the like running on the computer based on an instruction from the program code, and the functions according to the present exemplary embodiments described above are implemented by the processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing system comprising:
a display; and
a controller,
wherein the controller obtains character information from an image;
wherein the controller receives, in a state that a first image is displayed on the display, designation of a first position of a first area and designation of a second position of a second area,
wherein the controller specifies, based on first character information obtained from the first area at the first position of a second image, a folder name of a folder in which a file based on the second image is to be stored, and
wherein the controller specifies, based on second character information obtained from the second area at the second position of the second image, a file name of the file based on the second image.

2. The image processing system according to claim 1, wherein the controller performs a process for storing the file having the specified file name in the folder having the specified folder name.

3. The image processing system according to claim 2, wherein the controller transmits the file by performing the process, the transmitted file being stored in the folder having the specified folder name.

4. The image processing system according to claim 1, wherein the controller obtains the first character information and the second character information by performing a character recognition process.

5. The image processing system according to claim 1, wherein the first image is an image based on image data generated by a scan of a first document, and wherein the second image is an image based on image data generated by a scan of a second document.

6. The image processing system according to claim 5, further comprising:
a scanner that scans a document to generate image data,
wherein the first image is an image based on image data generated by the scan of the first document with the scanner, and
wherein the second image is an image based on image data generated by the scan of the second document with the scanner.

7. The image processing system according to claim 1, wherein the specified folder name includes one or more characters indicated by the first character information, and wherein the specified file name includes one or more characters indicated by the second character information.

8. The image processing system according to claim 1,
wherein the controller receives, in the state that the first image is displayed, designation of the first position of the first area, designation of the second position of the second area and designation of a third position of a third area, and
wherein the controller specifies, based on the first character information obtained from the first area at the first position of the second image and third character information obtained from the third area at the third position of the second image, the folder name of the folder.

9. An image processing apparatus comprising:
a display; and
a controller,
wherein the controller obtains character information from an image,
wherein the controller receives, in a state that a first image is displayed on the display, designation of a first position of a first area and designation of a second position of a second area; and
wherein the controller specifies, based on first character information obtained from the first area at the first position of a second image, a folder name of a folder in which a file based on the second image is to be stored, and
wherein the controller specifies, based on second character information obtained from the second area at the second position of the second image, a file name of the file based on the second image.

10. The image processing apparatus according to claim 9, wherein the controller performs a process for storing the file having the specified file name in the folder having the specified folder name.

11. The image processing apparatus according to claim 10, wherein the controller transmits the file by performing the process, the transmitted file being stored in the folder having the specified folder name.

12. The image processing apparatus according to claim 9,
wherein the controller obtains the first character information and the second character information by performing a character recognition process.

13. The image processing apparatus according to claim 9,
wherein the first image is an image based on image data generated by a scan of a first document, and
wherein the second image is an image based on image data generated by a scan of a second document.

14. The image processing apparatus according to claim 13, further comprising:
a scanner that scans a document to generate image data,
wherein the first image is an image based on image data generated by the scan of the first document with the scanner, and
wherein the second image is an image based on image data generated by the scan of the second document with the scanner.

15. The image processing apparatus according to claim 9,
wherein the specified folder name includes one or more characters indicated by the first character information, and
wherein the specified file name includes one or more characters indicated by the second character information.

16. The image processing apparatus according to claim 9,
wherein the controller receives, in the state that the first image is displayed, designation of the first position of the first area, designation of the second position of the second area and designation of a third position of a third area, and
wherein the controller specifies, based on the first character information obtained from the first area at the first position of the second image and third character information obtained from an the third area at the third position of the second image, the folder name of the folder.

17. A non-transitory computer-readable storage medium storing a program that, when executed by a computer, causes the computer to perform a method, the method comprising:
obtaining character information from an image;
receiving, in a state that a first image is displayed on a display, designation of a first position of a first area and a second position of a second area; and
specifying, based on first character information obtained from the first area at the first position of a second image, a folder name of a folder in which a file based on the second image is to be stored; and
specifying, based on second character information obtained from the second area at the second position of the second image, a file name of the file based on the second image.

18. The non-transitory computer-readable storage medium according to claim 17, the method further comprising:
performing a process for storing the file having the specified file name in the folder having the specified folder name.

19. The non-transitory computer-readable storage medium according to claim 18, the method further comprising:
transmitting the file by performing the process, the transmitted file being stored in the folder having the specified folder name.

20. The non-transitory computer-readable storage medium according to claim 17,
wherein the first character information and the second character information are obtained by performing a character recognition process.

21. The non-transitory computer-readable storage medium according to claim 17,
wherein the first image is an image based on image data generated by a scan of a first document, and
wherein the second image is an image based on image data generated by a scan of a second document.

22. The non-transitory computer-readable storage medium according to claim 21, the method further comprising:
scanning a document to generate image data, wherein the first image is an image based on image data generated by the scan of the first document by the scanning, and wherein the second image is an image based on image data generated by the scan of the second document by the scanning.

23. The non-transitory computer-readable storage medium according to claim 17,
wherein, in the state that the first image is displayed, designation of the first position of the first area, designation of the second position of the second area and designation of a third position of a third area of the first image are received, and
wherein the folder name of the folder is specified based on the first character information obtained from the first area at the first position of the second image and third character information obtained from the third area at the third position of the second image.

24. An image processing system comprising:
a display; and
a controller,
wherein the controller receives, in a state that an image originated from a scan is displayed on the display, designation of a first area,
wherein the controller receives, in a state that an image obtained originated from the scan is displayed on the display, designation of a second area, and
wherein the controller performs a process for storing a file whose file name includes one or more characters indicated by first character information obtained from the first area of another image in a folder whose folder name includes one or more characters indicated by second character information obtained from the second area of the another image, the file being based on the another image.

25. The image processing system according to claim 24, wherein the controller transmits the file by performing the process, the transmitted file being stored in the folder.

26. The image processing system according to claim 24, wherein the controller obtains the first character information and the second character information by performing a character recognition process.

27. The image processing system according to claim 24, wherein the image is an image based on image data generated by the scan of a first document, and wherein the another image is an image based on image data generated by a scan of a second document.

28. The image processing system according to claim 27, further comprising:
a scanner that scans a document to generate image data,
wherein the image is an image based on image data generated by the scan of the first document with the scanner, and
wherein the another image is an image based on image data generated by the scan of the second document with the scanner.

29. The image processing system according to claim 24, wherein the controller receives, in the state that the first image is displayed on the display, the designation of the first area, the designation of the second area and designation of a third area, and
wherein the controller performs a process for storing a file in a folder whose folder name includes one or more characters indicated by second character information obtained from the second area of the another image and one or more characters indicated by third character information obtained from the third area of the another image.

30. The image processing system according to claim 24,
wherein the controller receives, from a user, the designation of the first area and the designation of the second area, and
wherein the controller receives the designation of the second area in a state that the first area that has been designated by the user is displayed on the display so that the user is able to identify the first area.

31. The image processing system according to claim 24,
wherein the designation of the first area is a designation of a position of the first area, and
wherein the designation of the second area is a designation of a position of the second area.

32. An image processing apparatus comprising:
a display; and
a controller,
wherein the controller receives, in a state that an image originated from a scan is displayed on the display, designation of a first area,
wherein the controller receives, in a state that an image originated from the scan is displayed on the display, designation of a second area, and
wherein the controller performs a process for storing a file whose file name includes one or more characters indicated by first character information obtained from the first area of another image in a folder whose folder name includes one or more characters indicated by second character information obtained from the second area of the another image, the file being based on the another image.

33. The image processing apparatus according to claim 32, wherein the controller transmits the file by performing the process, the transmitted file being stored in the folder.

34. The image processing apparatus according to claim 32, wherein the controller obtains the first character information and the second character information by performing a character recognition process.

35. The image processing apparatus according to claim 32, wherein the image is an image based on image data generated by the scan of a first document, and wherein the another image is an image based on image data generated by a scan of a second document.

36. The image processing apparatus according to claim 35, further comprising:
a scanner that scans a document to generate image data,
wherein the image is an image based on image data generated by the scan of the first document with the scanner, and
wherein the another image is an image based on image data generated by the scan of the second document with the scanner.

37. The image processing apparatus according to claim 32,
wherein the controller receives, in the state that the image is displayed on the display, the designation of the first area, the designation of the second area and designation of a third area, and
wherein the controller performs a process for storing a file in a folder whose folder name includes one or more characters indicated by second character information obtained from the second area of the another image and one or more characters indicated by third character information obtained from the third area of the another image.

38. The image processing apparatus according to claim 32,
- wherein the controller receives, from a user, the designation of the first area and the designation of the second area, and
- wherein the controller receives the designation of the second area in a state that the first area that has been designated by the user is displayed so that the user is able to identify the first area.

39. The image processing apparatus according to claim 32,
- wherein the designation of the first area is a designation of a position of the first area, and
- wherein the designation of the second area is a designation of a position of the second area.

40. A non-transitory computer-readable storage medium storing a program that, when executed by a computer, causes the computer to perform a method, the method comprising:
- receiving, in a state that an image originated from a scan is displayed on the display, designation of a first area;
- receiving, in a state that an image originated from the scan is displayed on the display, designation of a second area; and
- performing a process for storing a file whose file name includes one or more characters indicated by first character information obtained from the first area of a another image in a folder whose folder name includes one or more characters indicated by second character information obtained from the second area of the another image, the file being based on the another image.

41. The non-transitory computer-readable storage medium according to claim 40,
- wherein the file is transmitted by performing the process, the transmitted file being stored in the folder.

42. The non-transitory computer-readable storage medium according to claim 40, further comprising:
- obtaining the first character information and the second character information by performing a character recognition process.

43. The non-transitory computer-readable storage medium according to claim 40,
- wherein the image is an image based on image data generated by the scan of a first document, and wherein the another image is an image based on image data generated by a scan of a second document.

44. The non-transitory computer-readable storage medium according to claim 43, further comprising:
- scanning a document to generate image data,
- wherein the image is an image based on image data generated by the scan of the first document in the scanning, and
- wherein the another image is an image based on image data generated by the scan of the second document in the scanning.

45. The non-transitory computer-readable storage medium according to claim 40,
- wherein, in the state that the image is displayed, the designation of the first area, the designation of the second area and designation of a third area are received, and
- wherein a file is stored in a folder whose folder name includes one or more characters indicated by second character information obtained from the second area of the another image and one or more characters indicated by third character information obtained from the third area of the another image.

46. The non-transitory computer-readable storage medium according to claim 40,
- wherein the designation of the first area and the designation of the second area from a user are received, and
- wherein the designation of the second area is received in a state that the first area that has been designated by the user is displayed on the display so that the user is able to identify the first area.

47. The non-transitory computer-readable storage medium according to claim 40,
- wherein the designation of the first area is a designation of a position of the first area, and
- wherein the designation of the second area is a designation of a position of the second area.

* * * * *

UNITED STATES PATENT AND TRADEMARK OFFICE
CERTIFICATE OF CORRECTION

| | | |
|---|---|---|
| PATENT NO. | : 12,058,291 B2 | Page 1 of 1 |
| APPLICATION NO. | : 17/685191 | |
| DATED | : August 6, 2024 | |
| INVENTOR(S) | : Shu Kumahashi | |

It is certified that error appears in the above-identified patent and that said Letters Patent is hereby corrected as shown below:

In the Claims

Column 25, Line 26 in Claim 40, cancel the text "a"

Signed and Sealed this
Eighteenth Day of November, 2025

John A. Squires
*Director of the United States Patent and Trademark Office*